(12) United States Patent
Sueda et al.

(10) Patent No.: US 8,700,783 B2
(45) Date of Patent: Apr. 15, 2014

(54) COMMUNICATION CONTROL SYSTEM, COMMUNICATION CONTROL METHOD, CALL CONTROL SERVER DEVICE, AND CALL CONTROL PROGRAM

(75) Inventors: Yoshiko Sueda, Musashino (JP); Masashi Toyama, Musashino (JP); Koji Murakami, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 478 days.

(21) Appl. No.: 12/996,807

(22) PCT Filed: Jun. 15, 2009

(86) PCT No.: PCT/JP2009/060882
§ 371 (c)(1),
(2), (4) Date: Dec. 8, 2010

(87) PCT Pub. No.: WO2009/154172
PCT Pub. Date: Dec. 23, 2009

(65) Prior Publication Data
US 2011/0125910 A1     May 26, 2011

(30) Foreign Application Priority Data
Jun. 16, 2008 (JP) ................................ 2008-157184

(51) Int. Cl.
*G06F 15/16* (2006.01)

(52) U.S. Cl.
USPC ......................................................... 709/227

(58) Field of Classification Search
USPC .............................................. 709/227, 228
See application file for complete search history.

(56) References Cited

U.S. PATENT DOCUMENTS

2002/0147818 A1  10/2002  Wengrovitz
2003/0174684 A1*  9/2003  Pohjanvuori et al. ......... 370/338
(Continued)

FOREIGN PATENT DOCUMENTS

| CN | 1677422 A | 10/2005 |
|---|---|---|
| EP | 1 248 439 A2 | 10/2002 |

(Continued)

OTHER PUBLICATIONS

Extended European Search Report issued Dec. 14, 2012 in Patent Application No. 09766620.0.

(Continued)

*Primary Examiner* — Wing F Chan
*Assistant Examiner* — Andrew Woo
(74) *Attorney, Agent, or Firm* — Oblon, Spivak, McClelland, Maier & Neustadt, L.L.P.

(57) ABSTRACT

Upon receipt of an access request from a Web terminal, a service providing server transmits a shop ID stored in an external information database to the Web terminal. When the shop ID is selected by the Web terminal, the service providing server acquires external connection destination information, and notifies a SIP proxy server of the information via the Web terminal. When notified of the information, the SIP proxy server identifies internal connection destination information in an internal information database, based on an IP address added at the time of the notification of the external connection destination information. After making a call to a telephone device with the use of the identified internal connection destination information, the SIP proxy server makes a call to the shop with the use of the external connection destination information. After that, the SIP proxy server establishes a connection between the telephone device and the shop.

16 Claims, 19 Drawing Sheets

(56) References Cited

U.S. PATENT DOCUMENTS

| | | |
|---|---|---|
| 2005/0044188 A1* | 2/2005 | Nakazawa et al. ............ 709/219 |
| 2005/0210143 A1 | 9/2005 | Wengrovitz |
| 2005/0222920 A1 | 10/2005 | Yamagata et al. |
| 2006/0050686 A1* | 3/2006 | Velez-Rivera et al. ........ 370/352 |
| 2006/0182243 A1* | 8/2006 | Yun ............................ 379/114.1 |

FOREIGN PATENT DOCUMENTS

| | | |
|---|---|---|
| EP | 1 248 439 A3 | 10/2002 |
| JP | 10 336349 | 12/1998 |
| JP | 2001 339518 | 12/2001 |
| JP | 2003 022223 | 1/2003 |
| JP | 2006 108768 | 4/2006 |
| JP | 2006 229964 | 8/2006 |
| JP | 2007 067544 | 3/2007 |
| JP | 2008 098786 | 4/2008 |
| WO | WO 99/16203 A2 | 4/1999 |
| WO | WO 99/16203 A3 | 4/1999 |

OTHER PUBLICATIONS

J. Rosenberg, et al., Best Current Practices for Third Party Call Control (3pcc) in the Session Initiation Protocol (SIP), XP015009505, Apr. 1, 2004, 31 pages.

Combined Office Action and Search Report issued Nov. 21, 2012 in Chinese Patent Application No. 200980121471.5 with English translation of categories of cited documents.

International Search Report issued Jul. 14, 2009 in PCT/JP09/060882 filed Jun. 15, 2009.

* cited by examiner

FIG.3

| SHOP ID | SHOP NAME | CATEGORY | ADDRESS | SIP-URI |
|---|---|---|---|---|
| 11111 | SHOP A | RESTAURANT | XXX KICHIJOJI, MUSASHINO-CITY | 031234567@ntt.co.jp |
| 1113113 | SHOP B | HOUSING | YYY KICHIJOJI, MUSASHINO-CITY | 06123@ntt.co.jp |
| 1511113 | SHOP C | LIFE STYLE | ZZZ KICHIJOJI, MUSASHINO-CITY | 075123@ntt.co.jp |
| ... | ... | ... | ... | ... |

FIG.4

| SIP-URI (TO BE CALLER ID) | IP ADDRESS |
|---|---|
| 0422xx@example.co.jp | 192.168.1.1 |
| 0432XXXX@ntt.co.jp | 192.168.111.13 |
| 0424XXXX@ntt.co.jp | 192.168.11.113 |
| ... | ... |

FIG.6A

| SEARCH SITE | | ☒ |
|---|---|---|
| | | (BUDGET) |
| ·BAR | SHOP A | 3000 YEN |
| | SHOP B | 4000 YEN |
| ·RESTAURANT | SHOP C | 5000 YEN |
| | SHOP D | 10000 YEN |

FIG.6B

| CALL SCREEN | | ☒ |
|---|---|---|
| SELECTED SHOP | SHOP A | |
| PHONE NUMBER | 03yyy | |
| CALL | OK | NG |

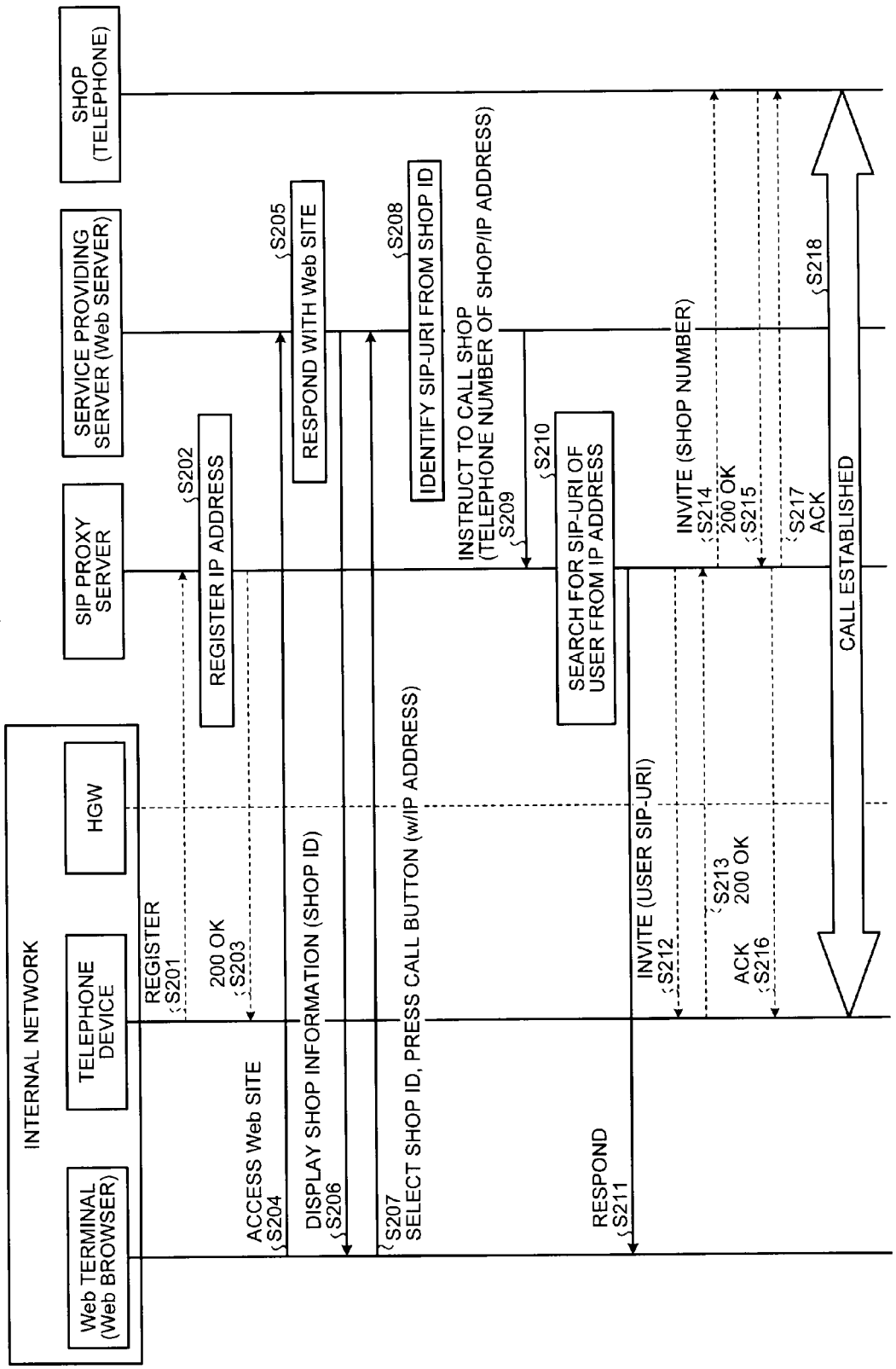

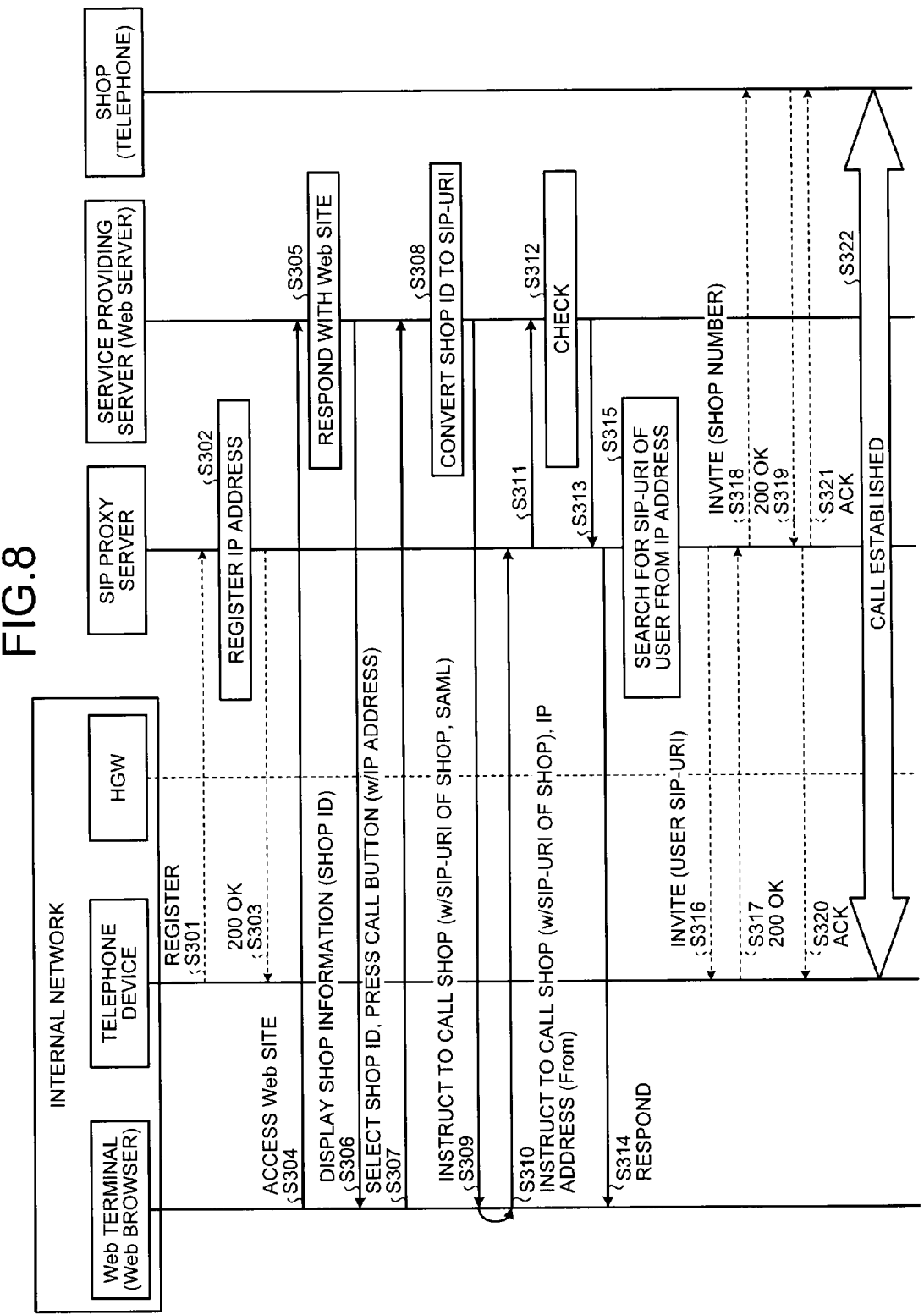

FIG.9

```
<Assertion ID="_a75adf55-01d7-40cc-929f-dbd8372ebdfc" IssueInstant="2003-04-17T00:46:02Z"
Version="2.0"
xmlns="urn:oasis:names:tc:SAML:2.0:assertion">
<Issuer> idp.example.com</Issuer>
<Subject>
<NameID Format=" urn:oasis:names:tc:SAML:2.0:attrname-format:uri ">
   192.168.3.11                                                          } IP ADDRESS OF CALLER  } DOMAIN INFORMATION ABOUT SERVICE PROVIDING SERVER
</NameID>
<SubjectConfirmation Method="urn:oasis:names:tc:SAML:2.0:cm:sender-vouches"/>
</Subject>
<Conditions NotBefore="2007-04-17T00:46:02Z" NotOnOrAfter="2007-04-17T00:51:02Z">
<AudienceRestriction>
<Audience>
       sip.example2.com                                                  } DOMAIN INFORMATION ABOUT SIP PROXY SERVER
</Audience>
</AudienceRestriction>
</Conditions>
<AttributeStatement>
<saml:Attribute
xmlns:x500= "urn:oasis:names:tc:SAML:2.0:profiles:attribute:X500"
NameFormat="urn:oasis:names:tc:SAML:2.0:attrname-format:uri"
Name="urn:oid:2.5.4.20"
FriendlyName="telephoneNumber">
<saml:AttributeValue xsi:type="xs:string">
     0422592222                                                          } TELEPHONE NUMBER OF SHOP
</saml:AttributeValue>
</saml:Attribute>
</AttributeStatement>
(SIGNATURE OMITTED)
</Assertion>
```

FIG.10

```xml
<ds:Signature xmlns:ds="http://www.w3.org/2000/09/xmldsig#">
    <ds:SignedInfo>
        <ds:CanonicalizationMethod Algorithm="http://www.w3.org/2001/10/xml-exc-c14n#"/>
        <ds:SignatureMethod Algorithm="http://www.w3.org/2000/09/xmldsig#rsa-sha1"/>
        <ds:Reference URI="#_a75adf55-01d7-40cc-929f-dbd8372ebdfc">
            <ds:Transforms>
                <ds:Transform Algorithm="http://www.w3.org/2000/09/xmldsig#enveloped-signature"/>
                <ds:Transform Algorithm= "http://www.w3.org/2001/10/xml-exc-c14n#" >
                    <InclusiveNamespaces PrefixList="#default saml ds xs xsi"
                    xmlns= "http://www.w3.org/2001/10/xml-exc-c14n#"/>
                </ds:Transform>
            </ds:Transforms>
            <ds:DigestMethod Algorithm="http://www.w3.org/2000/09/xmldsig#sha1"/>
            <ds:DigestValue>
Kclet6XcaOgOWXM4gty6/UNdvil=
            </ds:DigestValue>
        </ds:Reference>
    </ds:SignedInfo>
    <ds:SignatureValue>
hg4zk+ZknjggCQgZm7ea8fi7....Hr7wHxvCCRwubnmIfZ6RqVL+wNmeWl4=        SIGNATURE DATA
    </ds:SignatureValue>
    <ds:KeyInfo>
        <ds:X509Data>
            <ds:X509Certificate>                                            PUBLIC KEY
                                                                           INFORMATION
MIICyjCCAjOgAwIBAgICAnUwDQYJKoZIhvcNAQEEBQAwgakxCzAJBgNVBAYTAIVT
MRIwEAYDVQQIEwIXaXNjb.....dnP6Hr7wHxvCCRwubnmIfZ6QZAv2FU78pLX
8I3bsbmRAUg4UP9hH6ABVq4KQKMknxu1xQxLhpR1yIGPdiowMNTrEG8cCx3w/w==
            </ds:X509Certificate>
        </ds:X509Data>
    </ds:KeyInfo>
</ds:Signature>
```

FIG.13

| RANDID (= IDENTIFIER) | BLOGGER ID | BLOG URI |
|---|---|---|
| 11111e39564yu | aaaa | /20080508 |
| 22222e39564yu | aaaa | /20080508 |

FIG.14

| BLOGGER ID | DATE | NUMBER OF SHOPS | NUMBER OF PVs |
|---|---|---|---|
| aaaa | 2008/05/08 | 3 | 2 |
| bbbb | 2008/05/08 | 4 | 2 |

FIG.15

| RANDID | DATE | SHOP ID |
|---|---|---|
| 11111e39564yu | 2008/05/08 10:00:53 | 11111 |
| 22222e39564yu | 2008/05/08 10:00:59 | 11111 |
| 22222e39564yu | 2008/05/08 10:02:55 | 22222 |

FIG.16

| BLOGGER ID | DATE | NUMBER OF CLICKS |
|---|---|---|
| aaaa | 2008/05/08 | 1 |
| bbbb | 2008/05/08 | 2 |

FIG.17

| SHOP ID | DATE | NUMBER OF CLICKS |
|---|---|---|
| 11111 | 2008/05/08 | 2 |
| 22222 | 2008/05/08 | 1 |

FIG.18

| BLOGGER ID | PERIOD | SHOP ID | NUMBER OF CLICKS |
|---|---|---|---|
| aaaa | 2008/05 | 11111 | 4 |
| aaaa | 2008/05 | 22222 | 6 |

FIG.19

| RANDID | DATE | From (OR IP ADDRESS) | TO (OPTIONAL) |
|---|---|---|---|
| 11111e39564yu | 2008/05/08 10:00:53 | 031234567@ntt.co.jp | 0422xx@example.co.jp |
| 22222e39564yu | 2008/05/08 10:00:59 | 031234567@ntt.co.jp | 0422xx@example.co.jp |
| 22222e39564yu | 2008/05/08 10:02:55 | 129.34.44.43 | 0422yy@example.co.jp |

FIG.20

| BLOGGER ID | DATE | NUMBER OF CALLS |
|---|---|---|
| aaaa | 2008/05/08 | 1 |
| bbbb | 2008/05/08 | 2 |

FIG.21

| SHOP ID | DATE | NUMBER OF CALLS |
|---|---|---|
| 11111 | 2008/05/08 | 2 |
| 22222 | 2008/05/08 | 1 |

FIG.22

| From (OR IP ADDRESS) | DATE | NUMBER OF CALLS |
|---|---|---|
| 031234567@ntt.co.jp | 2008/05/08 | 1 |
| 129.34.44.43 | 2008/05/08 | 2 |

FIG.23

| BLOGGER ID | PERIOD | SHOP ID | NUMBER OF CALLS |
|---|---|---|---|
| aaaa | 2008/05 | 11111 | 4 |
| aaaa | 2008/05 | 22222 | 6 |

FIG.24

| BLOGGER ID | DATE | NUMBER OF CONNECTIONS |
|---|---|---|
| aaaa | 2008/05/08 | 1 |
| bbbb | 2008/05/08 | 1 |

FIG.25

| SHOP ID | DATE | NUMBER OF CONNECTIONS |
|---|---|---|
| 11111 | 2008/05/08 | 1 |
| 22222 | 2008/05/08 | 1 |

FIG.26

| From (OR IP ADDRESS) | DATE | NUMBER OF CONNECTIONS |
|---|---|---|
| 031234567@ntt.co.jp | 2008/05/08 | 1 |
| 129.34.44.43 | 2008/05/08 | 1 |

FIG.27

| BLOGGER ID | PERIOD | SHOP ID | NUMBER OF CONNECTIONS |
|---|---|---|---|
| aaaa | 2008/05 | 11111 | 1 |
| aaaa | 2008/05 | 22222 | 1 |

COMMUNICATION CONTROL SYSTEM, COMMUNICATION CONTROL METHOD, CALL CONTROL SERVER DEVICE, AND CALL CONTROL PROGRAM

FIELD

The present invention relates to a communication control system that connects an IP communication device in an internal network to an external device provided outside the internal network, with the internal network being formed with the IP communication device and an internal device that performs various communications. The present invention also relates to a communication control method, a call control server device, and a call control program.

BACKGROUND

The spread of broadband has increased the number of users who view Web pages through the Internet, using Web browsers and the like. Those Web pages are easily retrieved and retain a large amount of information, and therefore, they are being used in diverse forms of business.

As a form of usage in business, there has been a system in which reservations can be made or orders for products can be placed with actual shops, with the use of telephone numbers appearing on Web pages. For example, Patent Document 1 (Japanese Laid-open Patent Publication No. 10-336349) discloses a Click-To-Dial system that can transmit a call (a phone call) simply by clicking a call button through a Web browser.

Specifically, this is a system that is formed with a PC in which a special-purpose Web browser including special-purpose software having a function to make a call to a telephone device is installed, and a telephone device A to be connected to the PC. A user obtains the telephone number of a shop or the like he/she wishes to call from a Web page on the Internet or the like. The user then inputs the telephone number to a "phone number" input region of the special-purpose Web browser, and clicks the "call button". The special-purpose Web browser then makes a call to the telephone device A to be connected. When the user responds (for example, responds with on the hook) to the telephone device A, the special-purpose Web browser calls the telephone number that is input by the user.

CITATION LIST

Patent Literature

Patent Literature 1: Japanese Laid-open Patent Publication No. 10-336349

SUMMARY

Technical Problem

However, the above described conventional art has the problem that the special-purpose software is necessary, and the problem that operations are not easy as each user has to go through a lot of trouble.

Specifically, the special-purpose software to make a phone call from a PC needs to be installed in advance in the PC. Although a call (a phone call) is transmitted simply by clicking the "call button", the user needs to manually input the telephone number of the caller. Even if telephone numbers can be set in advance, they are not always set correctly due to human factors such as changes of addresses or input failures. Therefore, wrong numbers and the likes cannot be prevented, and users need to take a lot of trouble to use such a system.

The present invention has been made in view of the above circumstances, and the object thereof is to provide a communication control system that can easily establish a connection without any special-purpose software, a communication control method, a call control server device, and a call control program.

Solution to Problem

According to an embodiment, a communication control system connects an IP communication device in an internal network and an external device provided outside the internal network, the internal network being formed with the IP communication device and an internal device that performs various communications. The communication control system includes an internal information storage module that stores an identifier for uniquely identifying the internal device, the identifier being associated with internal connection destination information that indicates information for connecting to the IP communication device; an external information storage module that stores a device ID for uniquely identifying the external device, the device ID being associated with external connection destination information that indicates information for connecting to the external device; an access responding module that transmits the device ID stored in the external information storage module to the internal device, upon receipt of an access request from the internal device; an external information acquiring module that acquires, from the external information storage module, the external connection destination information corresponding to the notified device ID transmitted from the access responding module, when notified that the device ID is selected by the internal device; an internal information identifying module that identifies the internal connection destination information that is associated with the identifier of the internal device selecting the device ID and is stored in the internal information storage module, when notified that the device ID transmitted from the access responding module is selected by the internal device; a first transmitting module that makes a call to the IP communication device, using the internal connection destination information identified by the internal information identifying module; a second transmitting module that makes a call to the external device, using the external connection destination information acquired by the external information acquiring module, upon receipt of a response from the IP communication device called by the first transmitting module; and a connection establishing module that establishes a connection between the IP communication device called by the first transmitting module and the external device called by the second transmitting module, upon receipt of a response from the external device called by the second transmitting module.

According to another embodiment, a communication control system that includes an internal network formed with an IP communication device and an internal device that performs various communications, a Web server device that provides content to the internal device, a service providing server device that provides the internal device with content information for attracting customers to the content, an external device that puts up the content information on the content provided by the Web server device, and a call control server device that connects the IP communication device and the external device. In the communication control system, the Web server device includes an access responding module that transmits the content to the internal device by performing redirection via the service providing server, upon receipt of an access request from the internal device, the service providing server device includes: an external information storage module that stores a device ID for uniquely identifying the external device, the device ID being associated with external connection destination information that indicates information for connecting to the external device; and an external information transmitting module that acquires the external connection destination information corresponding to a selected device ID from the external information storage module, and notifies the call control server device of the acquired external connection destination information by performing redirection via the internal device, when the device ID provided to a Web terminal by the content is selected by the internal device, and the call control server device includes: an internal information storage module that stores an identifier for uniquely identifying the internal device, the identifier being associated with internal connection destination information that indicates information for connecting to the IP communication device; an internal information identifying module that, when notified of the external connection destination information from the service providing server device via the internal device, identifies the internal connection destination information in the internal information storage module, based on the identifier of the internal device added by the internal device at the time of the notification of the external connection destination information; a first transmitting module that makes a call to the IP communication device, using the internal connection destination information identified by the internal information identifying module; a second transmitting module that makes a call to the external device, using the external connection destination information transmitted from the service providing server device, upon receipt of a response from the IP communication device called by the first transmitting module; and a connection establishing module that establishes a connection between the IP communication device called by the first transmitting module and the external device called by the second transmitting module, upon receipt of a response from the external device called by the second transmitting module.

Advantageous Effects of Invention

According to the present invention, simply by clicking device information such as an advertisement appearing on a Web site accessed by a user using a conventional Web browser, a telephone call can be transmitted to an external device that has put up the advertisement on the Web site. As a result, an IP communication can be readily made without any special-purpose software.

For example, upon receipt of an inquiry using sound from a Web site, the shop can confirm that the inquiry is transmitted from the Web site. Also, an affiliate model utilizing telephones can be formed on the Web, for example.

Also, according to the present invention, each external device (each shop) that provides a widget (content information) to a Web server can recognize which blog (content) each user who has make a phone call to the shop has viewed. As a result, the shop can effectively entice and attract customers by realizing customer retention, for example.

BRIEF DESCRIPTION OF DRAWINGS

FIG. 3 is a chart showing an example of the information stored in the external information database;

FIG. 4 is a chart showing an example of the information stored in the internal information database;

FIG. 6A is an example of a Web site screen showing an advertisement having shop IDs attached thereto;

FIG. 6B is an example of a Web site screen displayed as a call confirmation on the Web terminal;

FIG. 7 is a sequence diagram showing the flow of an operation to transmit external connection destination information from the service providing server directly to the SIP proxy server;

FIG. 8 is a sequence diagram showing the flow of an operation to send a notification with the use of certification such as SAML when transmission is performed from the service providing server to the SIP proxy server via the Web terminal;

FIG. 9 is an example of the SAML to be added;

FIG. 10 is an example of the signature information written in the SAML;

FIG. 13 is a diagram showing an example case where a blog accessed by Web terminals is stored;

FIG. 14 is a diagram showing an example case where the numbers of times blogs have been accessed and viewed by Web terminals;

FIG. 15 is a diagram showing an example case where the shops clicked in a blog and dates are counted;

FIG. 16 is a diagram showing an example case where the number of times each widget in each blog has been actually selected through the Web terminal is counted;

FIG. 17 is a diagram showing an example case where the number of times each shop has been actually selected is counted;

FIG. 18 is a diagram showing an example case where the shops that have actually been selected and the number of times the shops have been selected during a predetermined period of time are counted for each blog;

FIG. 19 is a diagram showing an example case where callers and call destinations are stored;

FIG. 20 is a diagram showing an example case where the number of times a call has been made is counted with respect to each blog;

FIG. 21 is a diagram showing an example case where the number of times a call has been made is counted with respect to each shop;

FIG. 22 is a diagram showing an example case where the number of times each telephone device as an internal device has made a call is counted;

FIG. 23 is a diagram showing an example case where the number of times a call has been made during a predetermined period of time is counted with respect to each blog;

FIG. 24 is a diagram showing an example case where the number of times a connection has actually been established is counted with respect to each blog;

FIG. 25 is a diagram showing an example case where the number of times a connection has actually been established is counted with respect to each shop;

FIG. 26 is a diagram showing an example case where the number of times a connection has actually been established is counted with respect to each telephone device; and FIG. 27 is a diagram showing an example case where the shops that have actually established connections during a predetermined period of time, and the number of times a connection has actually been established are counted with respect to each blog.

DESCRIPTION OF EMBODIMENTS

Figure 1:
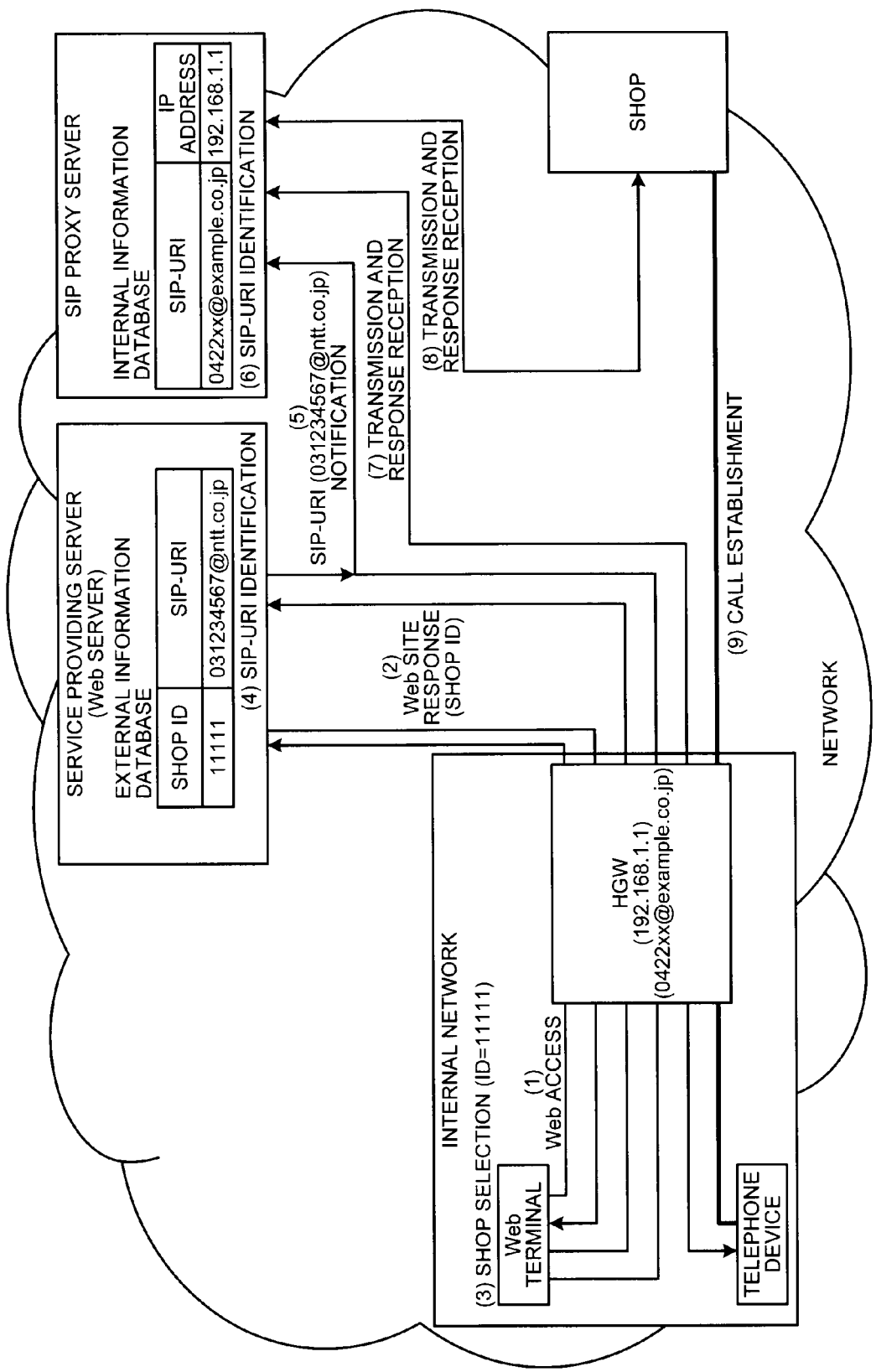
FIG. 1 is a system configuration chart showing the entire configuration of a communication control system according to a first embodiment.

The following is a detailed description of embodiments of a communication control system, a communication control method, a call control server device, and a call control program according to the present invention, with reference to the accompanying drawings. It should be noted that, in the following, the important terms and phrases to be used in this embodiment, the outline and features of the communication control system according to this embodiment, and the configuration and operation flow of the communication control system will be described in this order, and at the end, various modifications of this embodiment will be described.

First Embodiment

Explanation of Terms

First, principal terms and phrases used in this embodiment are explained. In the "communication control system (an example of the "communication control system" of the claims) used in this embodiment, an internal network formed with a Web terminal, a telephone device, and a Home Gateway (HGW), a service providing server that provides various kinds of Web sites such as search sites, a SIP proxy server that controls SIP communications, and a shop (a telephone device of a shop) that puts up the information about the shop on Web sites provided by the service providing server to attract customers are connected to one another via a network.

The "Web terminal (an example of the "internal device" of the claims)" used here is an apparatus such as a personal computer that performs Internet communications and the likes with the use of a conventional Web browser. The "telephone device (an example of the "IP communication device" of the claims)" is a telephone device or a softphone such as a VoIP telephone that has a numeral keypad and establishes a call connection by designating the other end with a dialing signal, or may be a television set having a Web browser and a remote controller or the like. Also, the "HGW" is a device that is connected to the internal network in which "192.168.1.1" is set as the IP address and "0422xx@xxx.co.jp" is set as the Session Initiation Protocol-Uniform Resource Identifier (SIP-URI), and to an external network in such a manner that the HGW can communicate with the internal network and the external network. The HGW performs address conversion and data replacement, so as to connect information appliances to each other. Specifically, the HGW is provided between the Internet and the internal network, and has a set-top box including a home router, a protocol converter, a firewall, a function to dynamically change the rules of the firewall, a broadcast receiving function, and the likes. In other words, a Web terminal and a telephone device can access a Web site via the HGW, using the same IP address.

The devices (information appliances) in the internal network are connected with the use of a protocol such as Digital Living Network Appliance (DLNA) or Universal Plug and Play (UPnP), which is a home appliance standardization technique. Other than the above mentioned devices, various apparatuses such as a hard disk recorder and a television set equipped with a Web browser are connected in the internal network. When communicating with an external network, those apparatuses perform communications via the HGW. For example, when a Web terminal performs a Web communication with the service providing server, a NAT transformation is performed at the HGW, and the Web terminal performs a communication with the service providing server, using the IP address "192.168.1.1" that is set in the HGW. Although IPv4 is described as an example in this embodiment, the same operation can be performed in the case of IPv6. Also, notation involving a prefix (192.168.1.0/24, for example) may be used.

The "service providing server (an example of the "service providing server device" of the claims)" is a device that provides various Web sites in response to accesses received via a network. For example, the service providing server provides Web sites such as search sites, news sites, and music sites. The "SIP proxy server (an example of the "call control server device" of the claims)" is a device that connects two or more devices by using Session Initiation Protocol (SIP).

The "shop (an example of the "external device" of claims)" secures customers by putting up an advertisement of the services (such as bar and restaurant businesses, and car sales) they are providing to customers on Web sites that are being provided by the service providing server. For example, the "shop" puts up an advertisement showing its "shop name, address, telephone number, and special offer (all-you-can-drink for 3,000 yen)" on a Web site of the service providing server. A customer can access the Web site with the use of a Web terminal, view various advertisements appearing on the Web site, and determine a shop that matches his/her own needs.

Brief Overview and Features of the Communication Control System

Referring now to FIG. 1, the brief overview and features of the communication control system according to the first embodiment are described. FIG. 1 is a system configuration chart showing the entire configuration of the communication control system according to the first embodiment. In this communication control system, an internal network that includes a Web terminal, a telephone device, and a HGW, a service providing server, a SIP proxy server, and a shop are connected to one another by a network.

With this configuration, the communication control system according to the first embodiment primarily connects the telephone device in the internal network and the shop located outside the internal network, and is particularly characterized by being capable of readily establishing a call connection without any special-purpose software. In the internal network, the Web terminal, the telephone device, and the HGW for controlling various kinds of communications with other networks are connected to one another.

The principal features are now specifically described. The SIP proxy server associates the identifier for uniquely identifying the Web terminal with internal connection destination information indicating the information for connecting to the telephone device, and stores the associated information into an internal information database. More specifically, the internal information database stores "192.168.1.1, 0422xx@example.co.jp" as "the <IP address> indicating the identifier for uniquely identifying the Web terminal, and the <SIP-URI> indicating the information for connecting to the telephone device in the internal network", for example. A case where an IP address that shows perfect matching in IPv4 is used as the identifier is described herein.

However, the present invention is not limited to that case. For example, an IP address that shows partial matching in the first half of IPv6 or a correlated IP address, or a user ID that is allotted in advance, may be used, as long as it can identify the Web terminal.

The service providing server associates the shop ID for uniquely identifying the shop (an example of the "device ID" of the claims) with the device information as to the shop, and stores the associated information into an external information database. More specifically, the external information database stores the "<SIP-URI> of the external device" indicating the device information associated with the "<shop ID> for uniquely identifying the shop" as the device ID. For example, the external information database stores "11111, 031234567@ntt.co.jp" or the like as the "shop ID, SIR-URI". The shop ID stored here is uniquely allotted beforehand by the service providing server upon request from the shop wishing to use Web sites.

If the service providing server receives an access request from the Web terminal in such a situation, the service providing server transmits the shop ID stored in the external information database to the Web terminal (see (1) and (2) in FIG. 1). More specifically, in the above described example, the Web terminal has a Web browser activated by a user operation, receives the URL of the service providing server, and accesses the service providing server. The service providing server then returns the Web site showing an advertisement having the shop ID "11111" that is stored in the external information database and is added thereto, to the Web terminal. Not only the above mentioned shop ID "11111" but also other shop IDs are attached to the Web site returned from the service providing server. In other words, this Web site shows more than one advertisement, like other general search sites. The above mentioned device information may be attached to each of the advertisements.

When the transmitted shop ID is selected through the Web terminal, the service providing server identifies and acquires the device information corresponding to the selected shop ID from the external information database, and notifies the SIP proxy server of the acquired device information (see (3) to (5) in FIG. 1) via the Web terminal. More specifically, when the advertisement having the shop ID "11111" attached thereto among the advertisements shown on the transmitted Web site is clicked through the Web terminal in the above described example, the service providing server identifies the device information "SIP-URI=031234567@ntt.co.jp" corresponding to the clicked shop ID "11111" in the external information database, and notifies the SIP proxy server of the device information by performing redirection via the Web terminal. At the time of this redirection, the IP address of the Web terminal (HGW) is added. Therefore, the service providing server notifies the SIP proxy server of the SIP-URI "031234567@ntt.co.jp" and the IP address "192.168.1.1" of the Web terminal.

The SIP proxy server then identifies the internal connection destination information about the Web terminal in the internal information database, based on the identifier that is added by the Web terminal at the time of notification of the device information (see (6) in FIG. 1). More specifically, when notified of the SIP-URI "031234567@ntt.co.jp" of the shop by the service providing server via the Web terminal in the above described example, the SIP proxy server identifies the SIP-URI "0422xx@example.co.jp" of the Web terminal in the internal information database, based on the IP address "192.168.1.1" that is the identifier added by the Web terminal at the time of notification of the SIP-URI "031234567@ntt.co.jp".

Using the identified internal connection destination information, the SIP proxy server then makes a call to the telephone device (see (7) in FIG. 1). More specifically, in the above described example, the SIP proxy server makes a call to the SIP-URI "0422xx@example.co.jp" (the telephone device) identified based on the IP address "192.168.1.1", by using SIP. After that, the SIP proxy server receives a response (such as an on-hook response) to the call, from the call destination (the telephone device).

Upon receipt of the response from the called telephone device, the SIP proxy server makes a call to the shop, using the device information identified in the external information database (see (8) in FIG. 1). More specifically, upon receipt of a response from the called telephone device in the above described example, the SIP proxy server calls the SIP-URI "031234567@ntt.co.jp" of the shop transmitted by the service providing server (the shop having the shop ID "11111" allotted thereto) by using SIP. After that, the SIP proxy server receives a response (such as an on-hook response) to the call, from the call destination (the shop).

After that, upon receipt of a response from the called shop, the SIP proxy server connects the called telephone device and the called external device (see (9) in FIG. 1). More specifically, upon receipt of a response from the called shop in the above described example, the SIP proxy server establishes a connection between the called telephone device and the called shop.

As described above, in the communication control system according to the first embodiment, a telephone call to a shop having an advertisement put up on a Web site can be made simply by clicking the advertisement (external information) appearing on the Web site that is accessed with the use of a conventional Web browser. As a result, a call connection can be readily established without special-purpose software, which is one of the above mentioned principal features.

Configuration of the Communication Control System

Figure 2:
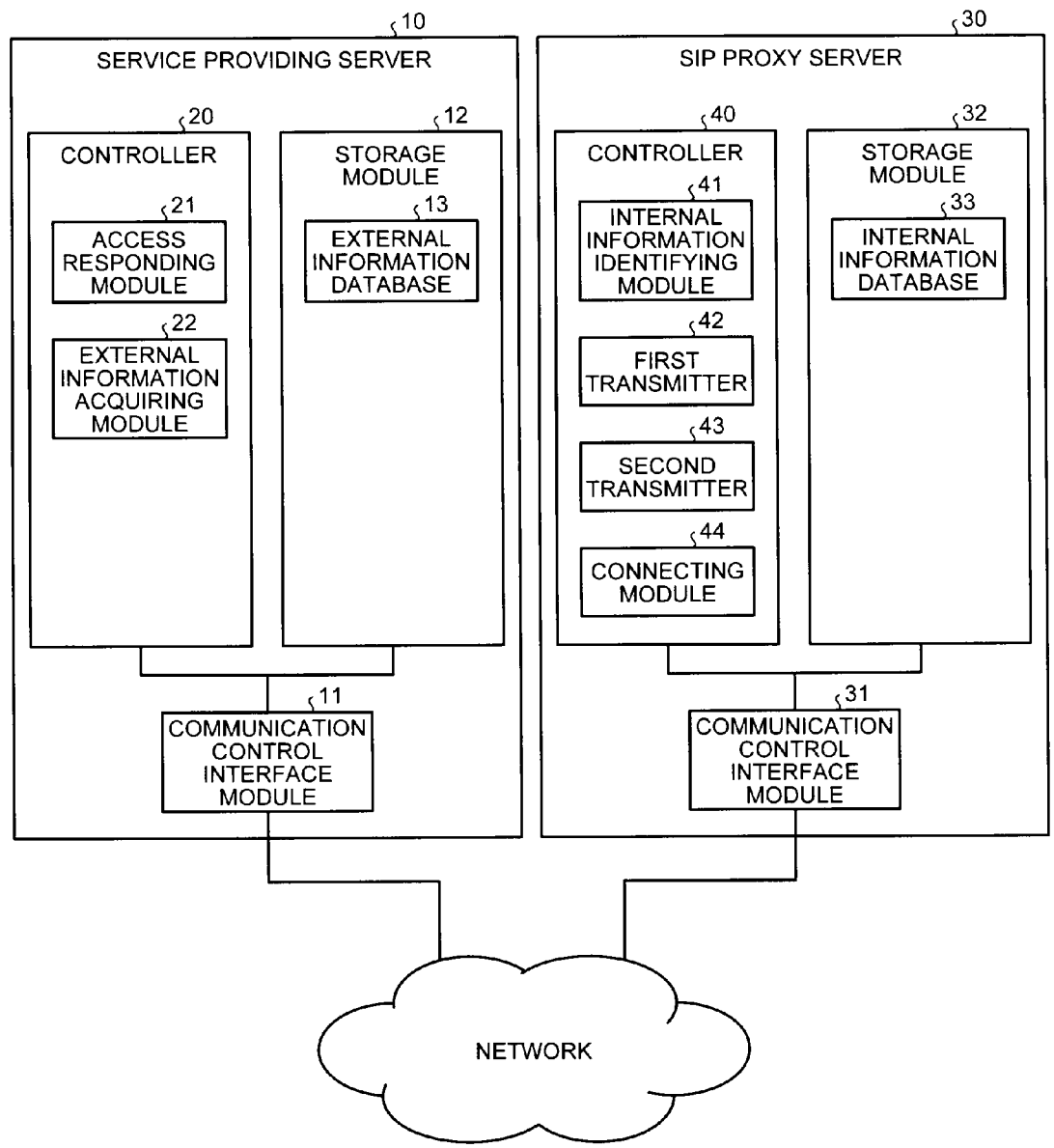
FIG. 2 is a block diagram showing the configuration of the communication control system according to the first embodiment.

Referring now to FIG. 2, the configuration of the communication control system shown in FIG. 1 is described. FIG. 2 is a block diagram showing the configuration of the communication control system according to the first embodiment. The HGW, the Web terminal, the telephone device, and the shop have the same structures as those of conventional devices, and therefore, only the service providing server and the SIP proxy server that have functions characteristic of the present invention are described herein.

Configuration of the Service Providing Server

As shown in FIG. 2, a service providing server 10 includes a communication control interface module 11, a storage module 12, and a controller 20. The communication control interface module 11 controls communications concerning various kinds of information with other devices connected via a network. More specifically, the communication control interface module 11 receives a Web access from the Web terminal in the internal network via the HGW, transmits a Web site to the Web terminal via the HGW, and notifies a SIP proxy server 30 of a SIP-URI, for example.

The storage module 12 stores the network information necessary to various kinds of communications, and the data and programs necessary for the controller 20 to perform various kinds of operations. As a component particularly relevant to the present invention, the storage module 12 includes an external information database 13. The external information database 13 stores "11111, shop A, restaurant, XXX Kichijoji, Musashino-city, 031234567@ntt.co.jp" or the like as the "<shop ID> for uniquely identifying the shop, the <shop name> indicating the name of the shop, the <category> to which the shop belongs, the <address> of the shop, and the <SIP-URI> of the shop", as shown in FIG. 3. The shop ID stored here is uniquely allotted by the service providing server upon request from the shop wishing to use Web sites. The above mentioned information containing various kinds of data and parameters may be arbitrarily changed. FIG. 3 is a chart showing an example of the information stored in the external information database.

The controller 20 includes an internal memory that stores a control program for the Operating System (OS) or the like, programs defining various kinds of procedures, and necessary data. As components particularly relevant to the present invention, the controller 20 includes an access responding module 21 and an external information acquiring module 22. The controller 20 performs various kinds of operations with those modules.

Upon receipt of an access request from the Web terminal, the access responding module 21 transmits a shop ID stored in the external information database 13 to the Web terminal. More specifically, upon receipt of an access by the Web browser from the Web terminal in the above described example, the access responding module 21 returns the Web site showing the advertisement having the shop ID "11111" stored in the external information database 13, to the Web terminal. Not only the above mentioned shop ID "11111" but also other shop IDs may be attached to the Web site returned from the service providing server. In other words, this Web site shows more than one advertisement, like other general search sites. The above mentioned device information is attached to each of the advertisements.

When the transmitted shop ID is selected by the internal device, the external information acquiring module 22 acquires the device information corresponding to the selected shop ID from the external information database 13, and notifies the SIP proxy server 30 of the device information via the internal device. More specifically, when the advertisement having the shop ID "11111" attached thereto among the advertisements appearing on the transmitted Web site is clicked through the Web terminal in the above described example, the external information acquiring module 22 receives the shop ID of the clicked advertisement from the Web terminal, and identifies the device information "SIP-URI=031234567@ntt.co.jp" corresponding to the transmitted shop ID "11111" in the external information database 13. The external information acquiring module 22 then notifies the SIP proxy server 30 of the identified device information "SIP-URI=031234567@ntt.co.jp" about the shop by performing redirection via the Web terminal.

Configuration of the SIP Proxy Server

As shown in FIG. 2, the SIP proxy server 30 includes a communication control interface module 31, a storage module 32, and a controller 40. The communication control interface module 31 controls communications concerning various kinds of information with other devices connected via a network. More specifically, the communication control interface module 31 receives a SIP-URI and an IP address from the service providing server 10, and controls communications with the telephone device in the internal network and the shop by using SIP, for example.

The storage module 32 stores the network information necessary to various kinds of communications, and the data and programs necessary for the controller 40 to perform various kinds of operations. As a component particularly relevant to the present invention, the storage module 32 includes an internal information database 33. The internal information database 33 stores the identifier for uniquely identifying the internal device associated with the internal connection destination information indicating the information for connecting to the telephone device. More specifically, the internal information database 33 in the above described example stores "192.168.1.1, 0422xx@example.co.jp" as "the <IP address> indicating the identifier for uniquely identifying the Web terminal, and the <SIP-URI> indicating the information for connecting to the telephone device in the internal network", as shown in FIG. 4. The above mentioned information containing various kinds of data and parameters may be arbitrarily changed. FIG. 4 is a chart showing an example of the information stored in the internal information database.

The controller 40 includes an internal memory that stores a control program for the Operating System (OS) or the like, programs defining various kinds of procedures, and necessary data. As components particularly relevant to the present invention, the controller 40 includes an internal information identifying module 41, a first transmitter 42, a second transmitter 43, and a connecting module 44. The controller 40 performs various kinds of operations with those modules.

When notified of the device information by the service providing server 10 via the Web terminal, the internal information identifying module 41 identifies the internal connection destination information about the Web terminal in the internal information database 33, based on the identifier that is added by the Web terminal at the time of notification of the device information. More specifically, when notified of the SIP-URI "031234567@ntt.co.jp" of the shop by the service providing server 10 via the Web terminal in the above described example, the internal information identifying module 41 identifies, in the internal information database 33, the SIP-URI "0422xx@example.co.jp" corresponding to the IP address "192.168.1.1" that is the identifier added by the Web terminal at the time of notification of the SIP-URI "031234567@ntt.co.jp".

Using the internal connection destination information identified by the internal information identifying module 41, the first transmitter 42 makes a call to the telephone device. More specifically, the first transmitter 42 calls the SIP-URI "0422xx@example.co.jp" by using SIP via the communication control interface module 31, based on the IP address "192.168.1.1" in the above described example. After that, the first transmitter 42 receives a response such as an on-hook response to the call from the call destination (the telephone device) via the communication control interface module 31.

Upon receipt of the response from the telephone device transmitted from the first transmitter 42, the second transmitter 43 makes a call to the external device, using the device information identified by the external information acquiring module 22. More specifically, upon receipt of the response from the telephone device transmitted from the first transmitter 42 in the above described example, the second transmitter 43 calls, by using SIP, the SIP-URI "031234567@ntt.co.jp" of the external device (the shop), which is identified and notified by the service providing server 10, via the communication control interface module 31. After that, the second transmitter 43 receives a response such as an on-hook response to the call from the call destination (the shop) via the communication control interface module 31.

Upon receipt of a response from the called external device, the connecting module 44 connects the called telephone device and the called external device. More specifically, in the above described example, upon receipt of a response from the called shop, the connecting module 44 connects the telephone device called by the first transmitter 42 and the shop called by the second transmitter 43. Based on acquired telephone numbers, the connecting module 44 can also connect the shop and the telephone device in the internal network, using a 3rd party call (RFC3725). More specifically, the connecting module 44 receives the telephone number (such as a SIP-URI) of the shop, and the telephone number (such as a SIP-URI) of the telephone device in the internal network via the service providing server. As a result, the connecting module 44 can recognize the service providing server 10, and can make calls to the shop and the telephone device in the internal network to which the Web terminal having accessed the Web site and clicked the shop is connected, with the telephone number (a SIP-URI) of the service providing server 10 being the caller ID.

Operations to be Performed by the Communication Control System

Figure 5:
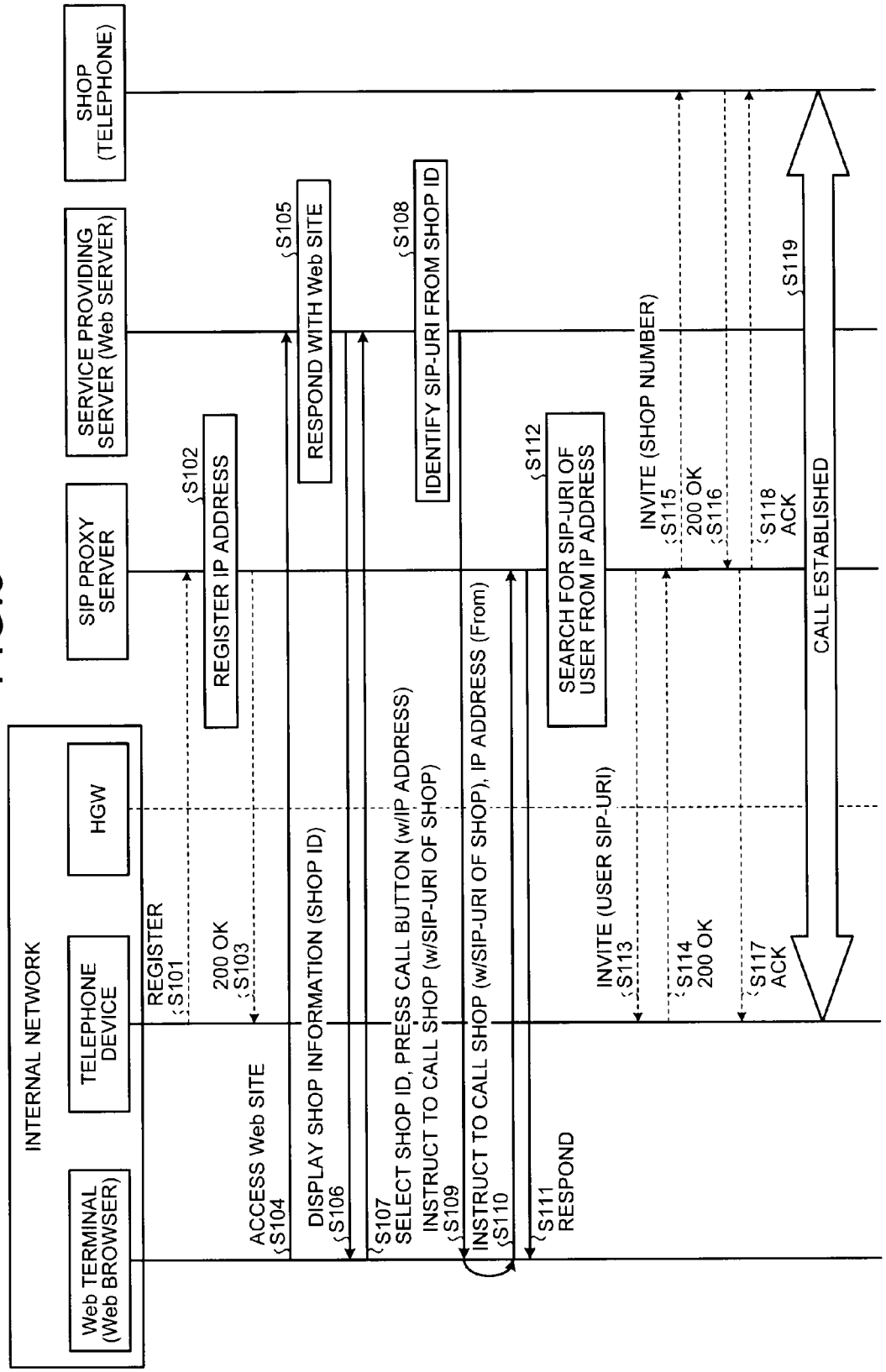
FIG. 5 is a sequence diagram showing the flow of an operation to be performed by the communication control system according to the first embodiment.

Referring now to FIG. 5, the flow of an operation to be performed by the communication control system is described. FIG. 5 is a sequence diagram showing the flow of the operation to be performed by the communication control system according to the first embodiment.

As shown in FIG. 5, the telephone device in the internal network transmits a "REGISTER message" of a SIP communication to the SIP proxy server 30 via the HGW, when the power supply is switched on or the expiration date of REGISTER passes (step S101). Upon receipt of the "REGISTER message", the SIP proxy server 30 stores the IP address attached to the REGISTER message by the HGW into the internal information database 33, with the IP address being associated with the SIP-URI of the telephone device. The SIP proxy server 30 then transmits a response "200 OK message" to the telephone device (steps S102 and S103).

In this description, the SIP proxy server 30 stores the IP address of the Web terminal associated with the SIP-URI of the telephone device, upon receipt of the "REGISTER message" of a SIP communication. However, the present invention is not limited to that arrangement, and the IP address of the Web terminal may be stored beforehand by a manager or the like.

After that, the Web terminal accesses the Web site provided by the service providing server 10 (step S104). Upon receipt of the access, the service providing server 10 transmits the Web site showing the advertisement having the shop ID of the external information attached thereto, as a response to the received access (steps S105 and S106).

More specifically, the service providing server 10 accessed by the Web terminal responds to the Web terminal by returning the Web site showing the advertisement having the shop ID that is stored in the external information database 13 and is attached thereto, as shown in FIG. 6A. FIG. 6B shows an example of the Web site screen showing advertisements having shop IDs attached thereto.

The Web terminal then receives a selected one of the advertisements shown on the received Web site, through an operation by a user (step S107). The service providing server 10 acquires the device information corresponding to the selected advertisement (the shop ID) from the external information database 13 (step S108).

More specifically, when the advertisement having the shop ID "11111" attached thereto among the advertisements shown on the transmitted Web site is clicked through the Web terminal in the above described example, the service providing server 10 identifies the device information "11111, shop A, restaurant, XXX Kichijoji, Musashino-city, 031234567@ntt.co.jp" corresponding to the clicked shop ID "11111" in the external information database 13. The service providing server 10 then transmits a screen that asks whether to make a call to the selected shop to the Web terminal, as shown in FIG. 6B. When "OK" shown in FIG. 6B is clicked, the service providing server 10 acquires the SIP-URI "031234567@ntt.co.jp" as the device information about the shop. FIG. 6B shows an example of a Web site screen displayed as a call confirmation on the Web terminal.

The service providing server 10 then notifies the SIP proxy server 30 of the SIP-URI acquired at step S108, via the Web terminal (steps S109 and S110). The SIP proxy server 30 then transmits a notification of a call to the Web terminal (step S111).

More specifically, in the above described example, the service providing server 10 notifies the SIP proxy server 30 of the acquired SIP-URI "031234567@ntt.co.jp" of the shop via the Web terminal. Since the SIP-URI "031234567@ntt.co.jp" of the shop as the device information is sent to the SIP proxy server 30 by performing redirection from the Web terminal, the IP address "192.168.1.1" of the Web terminal is added by the HGW at the time of notifying.

Based on the IP address added to the SIP-URI sent from the service providing server 10, the SIP proxy server 30 identifies the internal connection destination information about the internal device in the internal information database 33 (step S112). More specifically, in the above described example, the SIP proxy server 30 identifies the SIP-URI "0422xx@example.co.jp" in the internal information database 33, based on the IP address "192.168.1.1" attached to the SIP-URI "031234567@ntt.co.jp" of the shop sent from the service providing server 10.

After that, the SIP proxy server 30 makes a call to the telephone device, using the identified internal connection destination information. Upon receipt of a response to the call, the SIP proxy server 30 makes a call to the shop, using the SIP-URI sent from the service providing server 10 (steps S113 to S117). Upon receipt of a response from the called shop, the SIP proxy server 30 connects the called telephone device and the called shop (steps S118 and S119).

More specifically, in the above described example, the SIP proxy server 30 transmits "INVITE" to the telephone device, using the identified SIP-URI "0422xx@example. co. jp" of the telephone device. Upon receipt of "200 OK" from the telephone device, the SIP proxy server 30 transmits "INVITE" to the shop, using the SIP-URI "031234567@ntt.co.jp" of the shop sent from the service providing server 10. Upon receipt of "200 OK" from the called shop, the SIP proxy server 30 establishes a SIP communication between the telephone device and the shop. The telephone device and the shop are both called, with the telephone number of the service providing server being the caller ID.

The service providing server 10 and the SIP proxy server 30 can also acquire log information to be used for billing. Specifically, after step S108, the service providing server 10 may acquire the log concerning the selected shop ID. The service providing server 10 then counts the number of times the shop ID has been selected, and can charge the shop a fee or the like in accordance with the number of times the shop ID has been selected. Also, after step S110, the SIP proxy server 30 may acquire the log concerning the shop ID designated for a call. The SIP proxy server 30 then counts the number of times the shop ID has been designated for a call, and can charge the shop a fee or the like in accordance with the number of times the shop ID has been designated for a call. Also, after step S112, the SIP proxy server 30 may acquire the log concerning the shop ID that is actually called. The SIP proxy server 30 then counts the number of times the shop ID has been called, and can charge the shop a fee or the like in accordance with the number of times the shop ID has been called.

For example, after step S108, the service providing server 10 may acquire "the selected <date> and <SIP-URI> of the selected shop" as the log. The service providing server 10 then performs counting with respect to the <SIP-URI>, so that the service providing server 10 can charge the shop a fee or the like in accordance with the number of times the shop has been selected. Also, after step S110, the SIP proxy server 30 may acquire "the <date> designated for a call and the <SIP-URI> of the shop designated for a call" as the log. The SIP proxy server 30 then counts the number of times the <SIP-URI> has been designated for a call, so that the SIP proxy server 30 can charge the shop a fee or the like in accordance with the number of times the shop ID has been designated for a call. Likewise, after step S112, the SIP proxy server 30 may acquire "the data on which a call is actually made, and the <SIP-URI> of the shop actually called" as the log. The SIP proxy server 30 then counts the number of times the <SIP-URI> has been called, so that the SIP proxy server 30 can charge the shop a fee or the like in accordance with the number of times the shop ID has been called.

Other than the above described logs, after step S105, the service providing server 10 may acquire "the <date> on which a response is returned from the user (or the data selected by the user), and the <URL> indicating the returned Web site" as the log. The service providing server 10 then counts the number of times the <URL> has been returned, so that the service providing server 10 can charge the shop a fee or the like in accordance with the number of times the <URL> as actually been returned. After step S119, the SIP proxy server 30 may acquire "the <date> on which a connection is established, the <SIP-URI of the shop> indicating the transmitting end of the connection, and the <SIP-URI of the telephone device> indicating the receiving end of the connection" as the log. The SIP proxy server 30 counts the number of times this connection has been established, so that the SIP proxy server 30 can charge the shop a fee or the like in accordance with the number of times the connection has been established.

Advantages of the First Embodiment

As described above, according to the first embodiment, the IP address for uniquely identifying a Web terminal is associated with the SIP-URI indicating the information for connecting to a telephone device, and is then stored. The shop ID for uniquely identifying a shop is associated with the device information about the shop, and is then stored. When an access request is received from the Web terminal, a Web site showing an advertisement containing the shop ID is transmitted to the Web terminal. When the transmitted shop ID is selected through the Web terminal, the device information corresponding to the selected shop ID, and the SIP-URI for connecting to the shop is selected. Likewise, when the transmitted shop ID is selected through the Web terminal, the SIP-URI corresponding to the IP address of the Web terminal having selected the shop ID is identified, and, with the use of the identified SIP-URI, a call is made to the telephone device. When a response is received from the called telephone device, a call is made to the shop with the use of a generated SIP-URI. When a response is received from the called shop, a connection is established between the telephone device and the shop. Accordingly, to make a phone call to a shop having an advertisement on a Web site, a user simply needs to click the advertisement (external information) displayed on the Web site accessed by the user using a conventional Web browser. As a result, a phone call connection can be established without any special-purpose software.

Also, according to the first embodiment, to make a phone call to a shop shown on an advertisement, a user simply needs to click the advertisement on a Web site accessed with the use of a Web terminal. Accordingly, it is possible to prevent a call to a wrong person due to inputting of a wrong telephone number when the user makes a phone call. Also, according to the first embodiment, a phone call is made via the service providing server. Accordingly, each shop can recognize from which Web site each user has accessed the shop, and each user can prevent each call destination from obtaining his/her telephone number.

Also, according to the first embodiment, advertising effectiveness measurement is essential where a Web site is operated based on a request from a shop for homepage building, a search engine portal site, affiliate advertising, or the like. Examples of such methods include making users use coupons and prompting users to tell that they have seen AA, so as to confirm that each user has seen the Web site. Advertising effectiveness cannot be accurately measured by those measurement methods that rely on users. However, effectiveness can be surely achieved according to the present invention.

Second Embodiment

Although the SIP-URI of a shop is transmitted from a service providing server to a SIP proxy server via a Web terminal in the first embodiment, the present invention is not limited to that, and the SIP-URI can be transmitted by various other techniques.

In a second embodiment, the SIP-URI of a shop is transmitted from a service providing server to a SIP proxy server via a Web terminal by a different technique from that of the first embodiment. Referring now to sequence diagrams, the following cases are described: a case where transmission is performed from a service providing server directly to a SIP proxy server, with no Web terminals being involved; and a case where transmission is performed with the use of certification such as Security Assertion Markup Language (SAML) or the like when a notification is sent from a service providing server to a SIP proxy server via a Web terminal.

Sequence in the Case of Direct Transmission

Referring first to FIG. 7, the case where a notification is sent from a service providing server directly to a SIP proxy server, with no Web terminals being involved, is described. FIG. 7 is a sequence diagram showing the flow of an operation to transmit device information from the service providing server directly to the SIP proxy server. In this example, the service providing server and the SIP proxy server recognize each other as a trustworthy device.

As in the first embodiment, the service providing server includes an external information database that stores the SIP-URI of a shop or the like, and the SIP proxy server includes an internal information database that stores the SIP-URI of an internal network or the like.

As shown in FIG. 7, the SIP proxy server stores the IP address of a Web terminal associated with the SIP-URI of a telephone device, as in the first embodiment. The service providing server returns a Web site in response to an access from the Web terminal, and acquires the SIP-URI corresponding to a shop ID selected through the Web terminal (steps S201 to S208).

After that, unlike the service providing server of the first embodiment, the service providing server acquires the IP address of the Web terminal at the time of an access request, upon receipt of the access from the Web terminal. The service providing server then adds the IP address to the acquired SIP-URI, and transmits the SIP-URI and the IP address directly to the trustworthy SIP proxy server, without the Web terminal being involved (step S209). Steps S210 to S218 to be carried out thereafter are the same as steps S111 to S119 described in the first embodiment, and therefore, explanation of them is omitted herein.

In this manner, SIP-URIs can be transmitted and received only between trustworthy devices. Accordingly, leak and falsification of SIP-URIs can be prevented, and security can be tightened.

Sequence in the Case where Certification is Given When Transmission is Performed Referring now to FIG. 8, the case where certification in SAML or the like is used when transmission is performed from a service providing server to a SIP proxy server via a Web terminal is described. FIG. 8 is a sequence diagram showing the flow of an operation to send a notification with the use of SAML when transmission is performed from the service providing server to the SIP proxy server via the Web terminal.

As shown in FIG. 8, the SIP proxy server stores the IP address of the Web terminal associated with the SIP-URI of a telephone device, as in the first embodiment. The service providing server returns a Web site in response to an access from the Web terminal, and identifies the SIP-URI corresponding to a shop ID selected through the Web terminal (steps S301 to S308).

After that, unlike the service providing server of the first embodiment, the service providing server adds SAML to the identified SIP-URI, and transmits the SIP-URI to the SIP proxy server by performing redirection via the Web terminal (steps S309 and S310). The SIP proxy server then retransmits the SAML added to the received SIP-URI to the service providing server (step S311), and receives, from the service providing server, the result of a check made to determine whether the SAML is valid information (step S312).

Specifically, the service providing server adds the SAML shown in FIG. 9 to an identified SIP-URI, and transmits the SIP-URI to the SIP proxy server by performing redirection via the Web terminal. As shown in the figure, the domain information about the service providing server, the IP address of the caller, the domain information about the SIP proxy server, and the telephone number of the shop including the signature shown in FIG. 10 are written in this SAML. Upon receipt of this SAML, the SIP proxy server retransmits the SAML added to the received SIP-URI to the service providing server. The service providing server checks the domain information about the service providing server, the IP address of the caller, the domain information about the SIP proxy server, and the likes, to determine whether the SIP-URI is the one the service providing server has transmitted. The service providing server then notifies the SIP proxy server of the result of the determination.

Only if the SIP-URI is determined to be valid information by the service providing server (step S313), the SIP proxy server carries out the procedures of steps S314 to S322. The procedures of steps S314 to S322 are the same as those of steps S111 to S119 described in the first embodiment, and therefore, explanation of them is omitted herein.

In the above manner, leak and falsification of SIP-URIs can be prevented, and security can be tightened, even where the SIP-URI of a shop is transmitted from the service providing server to the SIP proxy server via a Web terminal.

Also, in this embodiment, where the SIP-URI of a shop is transmitted from the service providing server to the SIP proxy server via a Web terminal, leak and falsification of SIP-URIs are prevented with the use of SAML. However, the present invention is not limited to that arrangement, and it is possible to use any form of information such as electronic signatures that can be verified. FIG. 9 shows an example of the SAML to be added. FIG. 10 shows an example of the signature information written in the SAML.

Third Embodiment

Shop information is applied to advertisements appearing on a search site in the first and second embodiments. However, the present invention is not limited to that, and shop information may be applied to widgets used in various blogs.

In the third embodiment, the shop information described in the first and second embodiments is applied to widgets used in various blogs. In the following description of the third embodiment, the configuration of an entire communication control system according to the third embodiment, the operation flow, and the advantages of the third embodiment will be described in this order.

Configuration of the Entire Communication Control System (Third Embodiment)

Figure 11:
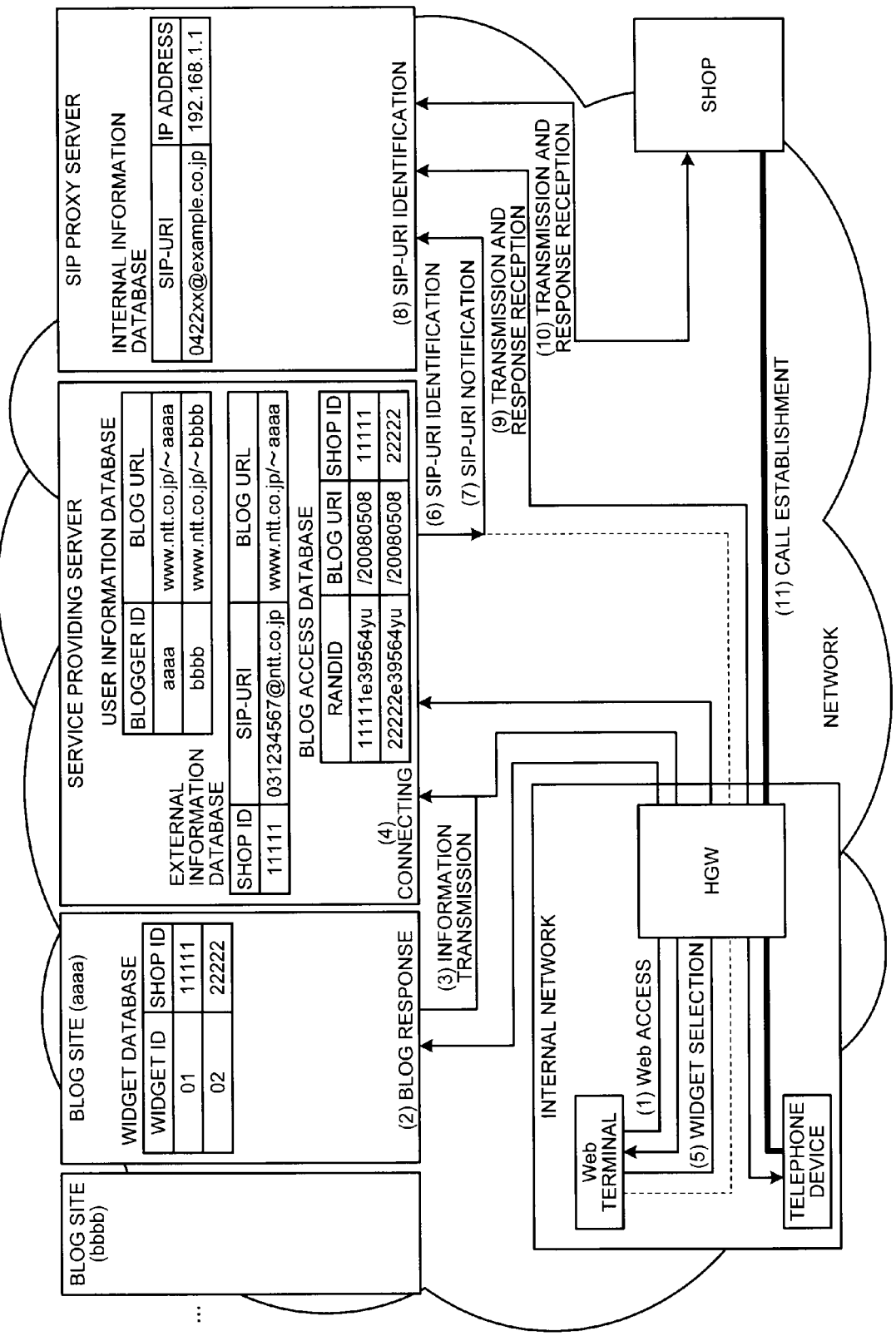
FIG. 11 is the configuration of an entire communication control system according to a third embodiment.

Referring first to FIG. 11, the configuration of the entire communication control system according to the third embodiment is described. FIG. 11 illustrates the configuration of the entire communication control system according to the third embodiment.

As shown in FIG. 11, in the communication control system according to the third embodiment, an internal network, a blog site that provides a blog to Web terminals, a service providing server that provides widgets to appear in blogs to attract customers, and a SIP proxy server that connects telephone devices to shops are connected to one another. In the internal network, a Web terminal that performs various kinds of communications, a telephone device that establishes call connections with other telephone devices, and a HGW that controls various kinds of communications with other networks are connected to one another. In this embodiment, one blog site is connected to the communication control system in the figure for ease of explanation. However, more than one blog site is connected to an actual system. In the following, a case where the Web terminal accesses the blog provided by the blog site shown in the figure is described.

In this structure, the SIP proxy server associates the identifier for uniquely identifying the internal device with the internal connection destination information indicating the information for connecting to the telephone device, and stores the associated information into an internal information database. Specifically, the internal information database stores "192.168.1.1, 0422xx@example.co.jp" as "the <IP address> indicating the identifier for uniquely identifying the Web terminal, and <SIP-URI> indicating the information for connecting to the telephone device in the internal network", for example. A case where an IP address is used as the identifier is described herein. However, the present invention is not limited to that case. For example, a user ID that is allotted in advance may be used, as long as it can identify the Web terminal.

The blog site associates widget IDs with shop IDs, and stores the IDs in a widget database. The widget IDs are identifiers for identifying widgets that appear in the blog provided by the device. The shop IDs are identifiers for identifying shops that provide the widgets as advertisements. Specifically, the widget database of the blog site stores "01, 11111" and "02, 22222" as the "widget IDs, shop IDs". In this example, two widgets are shown on the blog. However, the number of widgets is not limited to that.

The service providing server stores the information about the user who provides the blogs in a user information database. Specifically, the user information database of the service providing server stores "aaaa, www.ntt.co.jp/~aaaa" and "bbbb, www.ntt.co.jp/~bbbb" as the "<blogger IDs> for identifying users who operate blog sites, and the <blog URLs> indicating the blogs operated by bloggers", for example. Other than that, "names, addresses, telephone numbers, and card numbers" or the like may be stored as the information for identifying the bloggers.

The service providing server also stores the user information (shop information) about the widgets appearing in each blog. More specifically, the external information database of the service providing server stores "11111, 031234567@ntt.co.jp, www.ntt.co.jp/~aaaa" or the like as the "<shop ID> for identifying the shop that uses the widgets, <SIP-URI> indicating the contact information about the shop, <blog URL> indicating the blog in which the widget having the shop ID allotted thereto appears", for example. Other than that, "business manager's name, address, and telephone number" or the like may be stored as the information for identifying the shop.

Upon receipt of an access request from the Web terminal in this situation, the blog site responds to the Web terminal with a blog via the service providing server, while transmitting the information about the blog to the service providing server (see (1) to (3) in FIG. 11). More specifically, in the above described example, the Web terminal has a Web browser activated by a user operation, and accesses the blog provided by the blog site. The blog site then provides the blog to the Web terminal via the service providing server. The widget "ID=01" having the shop ID=11111 allotted thereto, and the widget "ID=02" having the shop ID=22222 allotted thereto are shown on the blog.

Upon receipt of a shop ID from the blog site, the service providing server associates the device ID with the identifier for uniquely identifying the access to the transmitted blog site, and stores the ID into a blog access database (see (4) in FIG. 11). More specifically, when the blog site provides the blog to the Web terminal via the service providing server, the blog access database of the service providing server generates the identifier (RANDID) for uniquely identifying the access from the Web terminal. The service providing server also stores the information (the shop IDs) about the widgets appearing in the blog associated with the generated RANDID and URI. In other words, the service providing server can recognize at which point the blog site that is being updated daily is accessed by the Web terminal, based on the RANDID.

When a widget appearing in the transmitted blog is selected through the Web terminal, the service providing server acquires the SIP-URI corresponding to the selected widget, and notifies the SIP proxy server of the SIP-URI via the Web terminal (see (5) to (7) in FIG. 11). More specifically, in the above described example, the Web terminal clicks the widget of "ID=01" appearing in the accessed blog. The service providing server then acquires the SIP-URI (031234567@ntt.co.jp) corresponding to the clicked widget (shop ID=11111) from the external information database. The service providing server then transmits the acquired corresponding SIP-URI (031234567@ntt.co.jp) to the SIP proxy server by performing redirection via the Web terminal.

Based on the identifier attached by the Web terminal when the SIP-URI is transmitted, the SIP proxy server identifies the internal connection destination information about the Web terminal in the internal information database (see (8) in FIG. 11). More specifically, when notified of the SIP-URI "031234567@ntt.co.jp" of the shop by the service providing server via the Web terminal in the above described example, the SIP proxy server identifies the SIP-URI "0422xx@example.co.jp" of the Web terminal in the internal information database, based on the IP address "192.168.1.1" that is the identifier added by the Web terminal when the SIP-URI "031234567@ntt.co.jp" is transmitted.

Using the identified internal connection destination information, the SIP proxy server then makes a call to the telephone device (see (9) in FIG. 11). More specifically, in the above described example, the SIP proxy server makes a call to the SIP-URI "0422xx@example.co.jp" (the telephone device) identified based on the IP address "192.168.1.1", by using SIP. After that, the SIP proxy server receives a response such as an on-hook response to the call, from the call destination (the telephone device).

Upon receipt of the response from the called telephone device, the SIP proxy server makes a call to the shop, using the device information identified in the external information database (see (10) in FIG. 11). More specifically, upon receipt of a response from the called telephone device in the above described example, the SIP proxy server calls the SIP-URI "031234567@ntt.co.jp" of the shop identified and transmitted by the service providing server (the shop having the shop ID "11111" allotted thereto) by using SIP. After that, the SIP proxy server receives a response such as an on-hook response to the call, from the call destination (the shop).

After that, upon receipt of a response from the called shop, the SIP proxy server connects the called telephone device and the called external device (see (11) in FIG. 11). More specifically, upon receipt of a response from the called shop in the above described example, the SIP proxy server establishes a connection between the called telephone device and the called shop.

As described above, in the communication control system according to the third embodiment, a telephone call to a shop having a widget as an advertisement on a blog site can also be made by clicking the widget appearing on the blog site. As a result, a phone call connection can be readily established without any special-purpose software.

Operation Flow in the Communication Control System (Third Embodiment)

Figure 12:
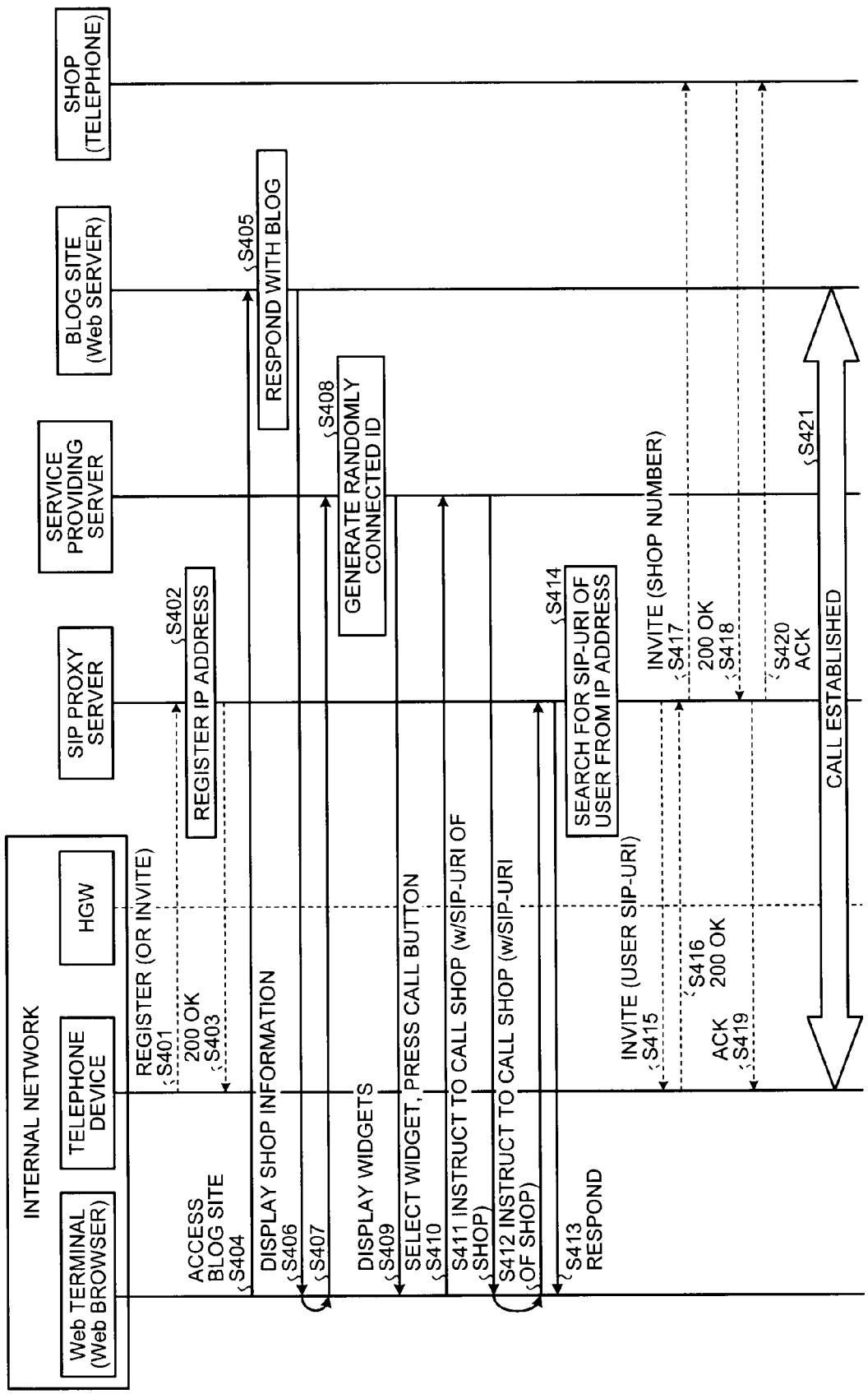
FIG. 12 is a sequence diagram showing the flow of an operation to be performed in the communication control system according to the third embodiment.

Referring now to FIG. 12, the flow of an operation to be performed in the communication control system according to the third embodiment is described. FIG. 12 is a sequence diagram showing the flow of the operation to be performed in the communication control system according to the third embodiment.

As shown in FIG. 12, the telephone device in the internal network transmits a "REGISTER message" of a SIP communication to the SIP proxy server via the HGW, when the power supply is switched on (step S401). Upon receipt of the "REGISTER message", the SIP proxy server stores the IP address attached to the "REGISTER message" by the HGW into the internal information database, with the IP address being associated with the SIP-URI of the telephone device (step S402). The SIP proxy server then transmits a response "200 OK message" to the telephone device (step S403).

After that, the Web terminal accesses the blog provided by the blog site (step S404). Upon receipt of the access, the blog site performs redirection via the Web terminal, and transmits the shop ID indicating the shop advertised in the form of a widget to the service providing server (steps S405 to S407).

Upon receipt of the shop ID from the blog site, the service providing server stores the device ID associated with the identifier for uniquely identifying the blog site, and transmits the blog received from the blog site to the Web terminal (steps S408 and S409).

When the transmitted shop ID is selected through the Web terminal, the service providing server acquires the SIP-URI (031234567@ntt.co.jp) corresponding to the clicked widget "shop ID=11111" from the external information database, and performs redirection via the Web terminal to transmit the SIP-URI (031234567@ntt.co.jp) to the SIP proxy server (steps S410 to S412).

The external connection destination information (SIP-URI) generated by the service providing server can be transmitted to the SIP proxy server via the Web terminal by the same technique as the technique described in the second embodiment. Specifically, the following techniques can be utilized: a technique by which transmission is performed from a service providing server directly to a SIP proxy server, with no Web terminals being involved; and a technique by which transmission is performed with the use of certification such as SAML or the like when a notification is sent from a service providing server to a SIP proxy server via a Web terminal. Since the flows in operations utilizing the respective techniques are the same as those described in the second embodiment, explanation of them is omitted herein.

The SIP proxy server then notifies the Web terminal that a call is to be made (step S413), and identifies the internal connection destination information "SIP-URI: 0422xx@xxx.co.jp" in the internal information database, with the internal connection destination information corresponding to the IP address that is the identifier of the Web terminal that has selected the shop ID (step S414).

After that, the SIP proxy server makes a call to the telephone device, using the identified SIP-URI "0422xx@xxx.co.jp" (step S415).

Upon receipt of a response from the called telephone device (step S416), the SIP proxy server makes a call to the shop, using SIP-URI "03yyy@yyy.com" transmitted from the service providing server (step S417).

Upon receipt of a response from the called shop (step S418), the SIP proxy server establishes a connection between the called telephone device and the called shop, and counts the number of times a connection has been established (steps S419 to S421).

Acquirement of Logs

In the third embodiment, logs to be used for charging bloggers and shops fees can also be acquired. Since it is possible to recognize which blog each user making a call has seen, fees can be paid to bloggers, based on the counted numbers (numbers of call connections, calls, and the likes). Accordingly, an affiliate model on the Web through telephone calls can be formed.

In the following, various logs to be acquired for forming an affiliate model on the Web through telephone calls are described in conjunction with the respective steps shown in FIG. 12.

Number of Times Each Subject is Selected

Referring now to FIGS. 13 to 18, a case where the service providing server counts the number of times a widget (a shop ID) appearing in a blog has been selected is first described. Specifically, upon receipt of a shop ID from a blog site, the service providing server generates the identifier for uniquely identifying the access to the blog, and stores the generated identifier associated with the shop ID and the blog URI at step S408 in FIG. 12. The information to be stored here can be realized by acquiring more specific information from the blog received from the blog site when information is stored into the blog access database shown in FIG. 11.

For example, after step S405, the service providing server acquires and stores "11111e39564yu, aaaa, /20080508" as the "<RANDID> indicating the generated identifier, <blogger ID> indicating the blog site that has transmitted the shop ID (the blog), and <blog URI> for identifying the status of the blog that has transmitted the shop ID" as shown in FIG. 13.

Likewise, after step S405, the service providing server acquires and stores "aaaa, 2008 May 8, 3, 2" as the "<blogger ID> indicating the blog site that has transmitted the shop ID, <date> indicating the date on which the shop ID is received from the blog site, <number of shops> indicating the number of widgets appearing in the blog, and <number of PVs (number of page views)> indicating the number of times the blog has been accessed" as shown in FIG. 14.

The service providing server that gathers such information counts the "number of PVs" shown in FIG. 14, so that it can pay each blogger a fee in accordance with the "number of PVs". FIG. 13 is a diagram showing an example case where a blog accessed by Web terminals is stored. FIG. 14 is a diagram showing an example case where the numbers of times blogs have been accessed and viewed by Web terminals.

For example, after step S410, the service providing server also acquires the "<RANDID> showing the blog in which the selected widget appears, <date> on which the widget is selected, and <SIP-URI> of the selected shop" shown in FIG. 15 as a log. The service providing server then counts the "blogger IDs" shown in FIG. 13, and the "dates" and "shop IDs" in FIG. 15 corresponding to "RANDID" in FIG. 13. By doing so, the service providing server can obtain "aaaa, 2008 May 8, 1" and the likes, each being the "<blogger ID> for identifying the blog site showing the widgets of the shop selected through a Web terminal, <date> indicating the date on which the blog site having the blogger ID allotted thereto is provided to the Web terminal, and <number of clicks> showing the number of times the widget appearing in the blog provided by the blog site has been clicked through Web terminals", as shown in FIG. 16. As a result, the service providing server can count the numbers of clicks in each blog. FIG. 15 is a diagram showing an example case where the shops clicked in a blog and dates are counted. FIG. 16 is a diagram showing an example case where the number of times each widget in each blog has been actually selected through the Web terminal is counted.

The service providing server also counts the "shop IDs" in FIG. 15 with respect to the respective "dates" shown in FIG. 15. By doing so, the service providing server can obtain "11111, 2008 May 8, 2" and the likes, each being the "<shop ID> showing the clicked shop, <date> indicating the status of the blog site when the shop is clicked, and <number of clicks> indicating the number of times the shop ID (widget) has been clicked through Web terminals", as shown in FIG. 17. As a result, the service providing server can count the number of clicks with respect to each shop. FIG. 17 is a diagram showing an example case where the number of times each shop has been actually selected is counted.

The service providing server also counts the "shop IDs" shown in FIG. 15 with respect to the "RANDID" corresponding to the "blogger ID" shown in FIG. 13. By doing so, the service providing server can obtain "aaaa, 2008 May, 11111, 4" and the likes, each being the "<blogger ID> for identifying the blog site showing the widget of the shop selected by a Web terminal, <period> indicating the counting period, <shop ID> indicating the clicked shop, and <number of clicks> indicating the number of times the shop ID (widget) has been clicked through Web terminals", as shown in FIG. 18. As a result, the service providing server can count the shops that have actually been selected and the number of times the shops have been selected during the predetermined period of time with respect to each blog. FIG. 18 is a diagram showing an example case where the shops that have actually been selected and the number of times the shops have been selected during the predetermined period of time are counted for each blog.

Numbers of Calls

Referring now to FIGS. 19 to 23, a case where the SIP proxy server counts the number of times a call has been made to each shop selected through a Web terminal, and the number of times a call has been made to each telephone device is described. Specifically, the SIP proxy server can count the number of times a call has actually been made with respect to each blog, the number of times a call has actually been made to each shop, the number of times a call has actually been made to each telephone device, the number of shops that have actually been called during a predetermined period of time with respect to each blog, and the number of times the shops have actually been called during the predetermined period with respect to each blog.

For example, after step S414 shown in FIG. 12, the SIP proxy server acquires and stores "11111e39564yu, 2008 May 8 10:00:53, 031234567@ntt.co.jp, 0422xx@example.co.jp" and the likes, each being the "<RANDID> generated for identifying access to the blog, <date> indicating the date on which the RANDID is generated, <From> indicating the telephone number of the caller received from the service providing server, and <TO> indicating the telephone number of the call destination identified by the device", as shown in FIG. 19. FIG. 19 is a diagram showing an example case where callers and call destinations are stored.

For example, the SIP proxy server that stores such information counts "From" associated with "RANDID" and "dates" shown in FIG. 19, and converts the "RANDID" into the "blogger ID" shown in FIG. 13, to perform counting. By doing so, the SIP proxy server can obtain "aaaa, 2008 May 8, 1" and the likes, each being the "<blogger ID> for identifying the blog site showing the widget of a called shop, <date> indicating the date on which the call is made, and <number of calls> indicating the number of times a call has been made", as shown in FIG. 20. As a result, the SIP proxy server can count the number of times a call has been made with respect to each blog. FIG. 20 is a diagram showing an example case where the number of times a call has been made is counted with respect to each blog.

The SIP proxy server also counts "From" associated with "RANDID" and "dates" shown in FIG. 19, converts the "RANDID" into the "shop IDs" shown in FIG. 15, and performs counting. By doing so, the SIP proxy server can obtain "11111, 2008 May 8, 2" and the likes, each being the "<shop ID> for identifying a called shop, <date> indicating the data on which the call is made, and <number of calls> indicating the number of times a call has been made", as shown in FIG. 21. As a result, the SIP proxy server can count the number of times a call has been made to each shop. FIG. 21 is a diagram showing an example case where the number of times a call has been made is counted with respect to each shop.

The SIP proxy server also performs counting by associating "From" with the "dates" shown in FIG. 19. By doing so, the SIP proxy server can count "031234567@ntt.co.jp, 2008 May 8, 1" and the likes, each being the "<From> indicating the telephone number of the telephone device as an internal device that has made a call, <date> indicating the date on which the call has been made, and <number of calls> indicating the number of times a call has been made", as shown in FIG. 22. As a result, the SIP proxy server can count the number of times each telephone device has made a call. FIG. 22 is a diagram showing an example case where the number of times each telephone device as an internal device has made a call is counted.

The SIP proxy server also identifies the "blogger ID" in FIG. 13 that corresponds to "RANDID" shown in FIG. 19, and converts the "RANDID" into the "blogger ID". The SIP proxy server also identifies the shop ID in FIG. 15 that corresponds to a set of "From" and "RANDID" shown in FIG. 19, and converts the "From" shown in FIG. 19 into the "shop ID". The SIP proxy server then counts "From" (the shop IDs in FIG. 15) with respect to each "date" shown in FIG. 19. By doing so, the SIP proxy server can obtain "aaaa, 2008 May, 11111, 4" and the likes, each being the "<blogger ID> for identifying the blog site showing the widget of a called shop, <period> indicating the counting period, <shop ID> indicating the called shop, and <number of calls> indicating the number of times a call has been made", as shown in FIG. 23. As a result, the SIP proxy server can count the shops that have actually been called within the predetermined period of time, and the number of times the shops have been called, with respect to each blog. FIG. 23 is a diagram showing an example case where the number of times a call has been made during the predetermined period of time is counted with respect to each blog.

Number of Connections

Referring now to FIG. 19 and FIGS. 24 to 27, a case where the SIP proxy server counts the number of times a call has actually been established between a shop and a telephone device is described. Specifically, the SIP proxy server can count the number of times a connection has actually been established with respect to each blog, the number of times a connection has actually been established with each shop, the number of times a connection has actually been established with each telephone device, the number of shops that have actually established connections during a predetermined period of time with respect to each blog, and the number of times a connection has actually been established during the predetermined period with respect to each blog.

For example, the SIP proxy server counts "From" associated with "RANDID" and the "dates" shown in FIG. 19, converts the "RANDID" into the "blogger IDs" shown in FIG. 14, and performs counting. By doing so, the SIP proxy server can obtain "aaaa, 2008 May 8, 1" and the likes, each being the "<blogger ID> for identifying the blog site showing the widget of the shop with which a call connection has actually been established, <date> indicating the date on which the connection has been established, and <number of connections> indicating the number of times a connection has been established", as shown in FIG. 24. As a result, the SIP proxy server can count the number of times a call connection has been established with respect to each blog. FIG. 24 is a diagram showing an example case where the number of times a connection has actually been established is counted with respect to each blog.

The SIP proxy server also counts "From" associated with "RANDID" and "dates" shown in FIG. 19, identifies the "shop ID" corresponding to the "RANDID" in FIG. 15, and performs counting. By doing so, the SIP proxy server can obtain "11111, 2008 May 8, 1" and the likes, each being the "<shop ID> for identifying the store with which a call connection has actually been established, <date> indicating the date on which the connection has been established, and <number of connections> indicating the number of times a connection has been established", as shown in FIG. 25. As a result, the SIP proxy server can count the number of times a call connection has been established with each shop. FIG. 25 is a diagram showing an example case where the number of times a connection has actually been established is counted with respect to each shop.

The SIP proxy server also performs counting by associating "From" having "TO" attached thereto with the "dates" shown in FIG. 19. By doing so, the SIP proxy server can obtain "031234567@ntt.co.jp, 2008 May 8, 1" and the likes, each being the "<From> indicating the telephone number of the telephone device having a call connection actually established, <date> indicating the date on which the connection has been established, and <number of connections> indicating the number of times a connection has been established", as shown in FIG. 26. As a result, the SIP proxy server can count the number of times a connection has actually been established with respect to each telephone number of callers. FIG. 26 is a diagram showing an example case where the number of times a connection has actually been established is counted with respect to each telephone number of callers.

The SIP proxy server also identifies the "blogger ID" in FIG. 13 that corresponds to "RANDID" shown in FIG. 19, and converts the "RANDID" into the "blogger ID". The SIP proxy server also identifies the shop ID in FIG. 15 that corresponds to a set of "From" having "TO" shown in FIG. 19 attached thereto and "RANDID" shown in FIG. 19, and converts the "From" shown in FIG. 19 into the "shop ID". The SIP proxy server then counts "From" (the shop IDs in FIG. 15) with respect to each "date" shown in FIG. 19. By doing so, the SIP proxy server can obtain "aaaa, 2008 May 8, 11111, 1" and the likes, each being the "<blogger ID> for identifying the blog site showing the widget of the shop with which a call connection has actually been established, <period> indicating the counting period, <shop ID> indicating the shop having a connection established, and <number of connections> indicating the number of times a connection has been established", as shown in FIG. 27. As a result, the SIP proxy server can count the shops that have actually established connections during the predetermined period of time, and the number of times a connection has actually been established during the predetermined period of time, with respect to each blog. FIG. 27 is a diagram showing an example case where the shops that have actually established connections during the predetermined period of time, and the number of times a connection has actually been established are counted with respect to each blog.

As described above, RANDID is used as identifiers. Accordingly, it is possible to accurately recognize when each widget is displayed, and determine whether the respective phases of clicking, calling, and receiving have been properly carried out.

Advantages of the Third Embodiment

As described above, according to the third embodiment, upon receipt of an access request from an internal device, a blog site transmits a blog to the internal device by performing redirection via the service providing server. The service providing server device stores the device ID for uniquely identifying a shop associated with the SIP-URI indicating the information for connecting to the shop. When the device ID provided in the blog is selected through a Web terminal, the service providing server acquires the SIP-URI corresponding to the selected device ID, and notifies the SIP proxy server of the acquired SIP-URI by performing redirection via the Web terminal. The SIP proxy server then stores the identifier for uniquely identifying the Web terminal associated with the SIP-URI indicating the information for connecting to an IP communication device. When notified of the SIP-URI of the shop from the service providing server via the Web terminal, the SIP proxy server identifies the SIP-URI of the telephone device, based on the IP address added by the Web terminal at the time of notification of the SIP-URI of the shop. Using the identified SIP-URI of the telephone device, the SIP proxy server makes a call to the telephone device. Upon receipt of a response from the called telephone device, the SIP proxy server makes a call to the shop, using the SIP-URI of the shop. Upon receipt of a response from the called shop, the SIP proxy server establishes a connection between the telephone device and the shop. Accordingly, the external device (the shop) that provides widgets in blog sites can recognize which blog each user who has made a phone call to the shop had viewed. As a result, the shop can effectively entice and attract customers by realizing customer retention, for example.

Also, according to the third embodiment, the service providing server counts the number of times each blog has been transmitted to Web terminals. Accordingly, it is possible to acquire a blog viewing status and the likes. For example, where a service system to which the present invention is applied is used, the usage fee of the system for a blog site providing a blog can be changed based on the blog viewing state, and the layout (the design) of a blog for attracting customers and the soliciting technique can be effectively changed.

Also, according to the third embodiment, the service providing server counts the number of times each shop ID has been selected through Web terminals. Accordingly, it is possible to acquire a widget access status and the likes. For example, where a service system to which the present invention is applied is used, the layout (the design) of a blog for attracting customers and the soliciting technique can be effectively changed. It is also possible to calculate the access rankings for widgets (shops). As a result, customers can be more effectively enticed, and the needs of customers can be more effectively met.

Also, according to the third embodiment, the SIP proxy server counts the number of times a call has been made to each telephone device, using identified internal connection destination information (SIP-URI). Accordingly, where a service system to which the present invention is applied is used, for example, it is possible to obtain not only the access status of each blog and each widget (shop), but also the information as to whether calls have actually been made.

Also, according to the third embodiment, upon receipt of a response from a called shop, the SIP proxy server counts the number of times a connection has been established between the telephone device and the shop. Accordingly, where a service system to which the present invention is applied is used, for example, it is possible to obtain not only the access status of each blog and each widget (shop), but also the information as to whether they have been actually used. As a result, the detailed information that can be effectively used to attract customers, such as the usage rankings for widgets (shops), can be calculated.

In the communication control system according to the third embodiment, SAML and certification may also be used by the same method as that in the second embodiment. For example, when notifying the SIP proxy server of generated external connection destination information (SIP-URI), the service providing server adds SAML or certification to the generated SIP-URI. Based on the SAML or certification sent from the service providing server via a Web terminal, the transmitted SIP-URI is verified as valid information. Under such conditions, the SIP proxy server identifies the SIP-URI of the telephone device in the internal information database from the IP address added by the Web terminal at the time of notification of the SIP-URI. In the above manner, leak and falsification of SIP-URIs can be prevented, and security can be tightened, even when the service providing server transmits the SIP-URIs of shops to the SIP proxy server via a Web terminal.

Fourth Embodiment

Although embodiments of the present invention have been described so far, various embodiments other than the above described embodiments may be formed according to the present invention. The following is a description of different embodiments: 1) forms of services; 2) system configurations and the likes; and 3) programs.

1) Forms of Services

In the first and second embodiments, advertisements appearing on Web sites have been described as examples. In the third embodiment, blogs have been described as examples. However, the present invention is not limited to them, and can be applied to various services using external devices from an internal network through a conventionally used Web browser.

In the first embodiment, a telephone call connection is established when a shop ID is clicked on the Web. However, the present invention is not limited to that. When a shop ID is clicked on the Web, the information about the shop may be displayed on a television set equipped with a Web browser or the like. When shop information is displayed on a television set with a Web browser or the like, the television set with a Web browser and the shop can be connected to each other by a VPN, and a high level of security can be maintained. In other words, IP communication devices to be used in the present invention are not limited to telephone devices described in the above embodiments.

2) System Configurations and the Likes

In the above described embodiments, the service providing server and the SIP proxy server are realized with separate housings. However, the present invention is not limited to that, and the service providing server and the SIP proxy server may be realized with the same housing.

Among the respective procedures described in the above embodiments, all of or some of the procedures described as procedures to be automatically carried out (such as the procedures for storing IP addresses and SIP-URIs in the SIP proxy server) may be manually carried out. Also, all of or some of the procedures described as procedures to be manually carried out. Also, all of or some of the procedures described as procedures to be manually carried out may be automatically carried out by a known method. Other than that, the operation procedures, the control procedures, the specific names, the information containing various data and parameters that are described in the above embodiments and are illustrated in the drawings (FIG. 3, FIG. 4, FIG. 6A, FIG. 6B, and FIGS. 13 to 27, for example) may be arbitrarily changed, unless otherwise specified.

Furthermore, the functions of the respective components of the respective devices illustrated in the drawings are conceptual functions, and those components may not physically have the structures illustrated in the drawings. Therefore, the specific forms of separation and integration of the respective devices are not limited to those illustrated in the drawings, and all of or some of the devices may be functionally or physically separated or integrated in arbitrary unit (for example, the first transmitter and the second transmitter may be united, or the IP address registration processing component of the SIP proxy server is provided outside, for example). Further, all of or arbitrary ones of the respective processing functions to be carried out in the respective devices can be realized by a CPU or a program to be analyzed and executed by the CPU, or can be realized as hardware with wired logics.

3) Programs

Each of the communication control methods described in the above embodiments can be realized by a computer such as a personal computer or a workstation executing a program that is prepared in advance. Such a program can be distributed over a network such as the Internet. Also, such a program can be recorded on a computer readable recording medium such as a hard disk, a flexible disk (FD), a CD-ROM, a MO, or a DVD, and can be executed by a computer that reads the program from the recording medium.

INDUSTRIAL APPLICABILITY

As described above, a communication control system, a communication control method, a call control server device, and a call control program according to the present invention are useful in connecting a telephone device in an internal network and an external device located outside the internal network that is formed with an internal device that performs various kinds of communications, the telephone device that is to be connected to other telephone devices, and a data relay device that controls various kinds of communications with other networks. Particularly, the communication control system, the communication control method, the call control server device, and the call control program are suitable for readily establishing a call connection without any special-purpose software.

REFERENCE SIGNS LIST

10 Service providing server
11 Communication control interface module
12 Storage module
13 External information database
20 Controller
21 Access responding module
22 External information acquiring module
30 SIP proxy server
31 Communication control interface module
32 Storage module
33 Internal information database
40 Controller
41 Internal information identifying module
42 First transmitter
43 Second transmitter
44 Connecting module

The invention claimed is:

1. A communication control system that connects an internal telephone device in an internal network and an external telephone device provided outside the internal network, the internal network being formed with the internal device and a web terminal device that is separate from the internal telephone device and that performs various communications, the communication control system comprising:

an internal information storage module that stores an identifier for uniquely identifying the web terminal device, the identifier being associated with internal connection destination information that indicates information for connecting to the internal telephone device;

an external information storage module that stores a device ID for uniquely identifying the external telephone device, the device ID being associated with external connection destination information that indicates information for connecting to the external telephone device;

an access responding module that transmits the device ID stored in the external information storage module to the web terminal device, upon receipt of an access request from the web terminal device;

an external information acquiring module that acquires, from the external information storage module, the external connection destination information corresponding to the notified device ID transmitted from the access responding module, when notified that the device ID is selected by a clicking operation on the web terminal device indicating that a user of the web terminal device has selected to make a telephone call to the external telephone device;

an internal information identifying module that identifies the internal connection destination information that is associated with the identifier of the web terminal device selecting the device ID and is stored in the internal information storage module, when notified that the device ID transmitted from the access responding module is selected by the web terminal device;

a first transmitting module that makes a call to the internal telephone device, using the internal connection destination information identified by the internal information identifying module;

a second transmitting module that makes a call to the external telephone device, using the external connection destination information acquired by the external information acquiring module, upon receipt of a response from the internal telephone device called by the first transmitting module; and a connection establishing module that establishes a connection between the internal telephone device called by the first transmitting module and the external telephone device called by the second transmitting module, upon receipt of a response from the external telephone device called by the second transmitting module.

2. The communication control system according to claim 1, wherein upon receipt of an access request from the web terminal device, the access responding module of the service providing server device generates and stores the external connection destination information into the external information storage module, and transmits the external connection destination information stored in the external information storage module to the web terminal device.

3. A communication control system that includes an internal network formed with an internal telephone device and a web terminal device that is separate from the internal telephone device and that performs various communications, a service providing server device that provides various services to the web terminal device, an external telephone device that is provided outside the internal network, and a call control server device that connects the internal telephone device and the external telephone device, the communication control system, wherein the service providing server device includes:

an external information storage module that stores a device ID for uniquely identifying the external telephone device, the device ID being associated with external connection destination information that indicates information for connecting to the external telephone device;

an access responding module that transmits the device ID stored in the external information storage module to the web terminal device, upon receipt of an access request from the web terminal device; and an external information acquiring module that acquires, from the external information storage module, the external connection destination information corresponding to the notified device ID transmitted from the access responding module, when notified that the device ID is selected by a clicking operation on the web terminal device indicating that a user of the web terminal device has selected to make a telephone call to the external telephone device, the external information acquiring module notifying the call control server device of the acquired external connection destination information, and the call control server device includes:

an internal information storage module that stores an identifier for uniquely identifying the web terminal device, the identifier being associated with internal connection destination information that indicates information for connecting to the internal telephone device;

an internal information identifying module that, when notified of the external connection destination information from the external information acquiring module of the service providing server device via the web terminal device, identifies the internal connection destination information in the internal information storage module, based on the identifier of the web terminal device added by the web terminal device at the time of the notification of the external connection destination information;

a first transmitting module that makes a call to the internal telephone device, using the internal connection destination information identified by the internal information identifying module;

a second transmitting module that makes a call to the external telephone device, using the external connection destination information acquired by the external information acquiring module, upon receipt of a response from the internal telephone device called by the first transmitting module; and a connection establishing module that establishes a connection between the internal telephone device called by the first transmitting module and the external telephone device called by the second transmitting module, upon receipt of a response from the external telephone device called by the second transmitting module.

4. The communication control system according to claim 3, wherein the external information acquiring module of the service providing server device adds a verifiable form to the external connection destination information, when notifying the call control server device of the acquired external connection destination information, and under the condition that the transmitted external connection destination information is verified as valid information based on the verifiable form transmitted from the service providing server device via the web terminal device, the internal information identifying module of the call control server device identifies the internal connection destination information about the web terminal device in the internal information storage module from the identifier of the web terminal device added by the web terminal device at the time of the notification of the external connection destination information.

5. The communication control system according to claim 3, wherein upon receipt of an access request from the web terminal device, the access responding module of the service providing server device generates and stores the external connection destination information into the external information storage module, and transmits the external connection destination information stored in the external information storage module to the web terminal device.

6. A communication control system that includes an internal network formed with an internal telephone device and a web terminal device that is separate from the internal telephone device and that performs various communications, a Web server device that provides content to the web terminal device, a service providing server device that provides the web terminal device with content information for attracting customers to the content, an external telephone device that puts up the content information on the content provided by the Web server device, and a call control server device that connects the internal telephone device and the external telephone device, the communication control system, wherein the Web server device includes
an access responding module that transmits the content to the web terminal device by performing redirection via the service providing server, upon receipt of an access request from the web terminal device, the service providing server device includes:

an external information storage module that stores a device ID for uniquely identifying the external telephone device, the device ID being associated with external connection destination information that indicates information for connecting to the external telephone device; and an external information transmitting module that acquires the external connection destination information corresponding to a selected device ID from the external information storage module, and notifies the call control server device of the acquired external connection destination information by performing redirection via the web terminal device, when the device ID provided to the web terminal device by the content is selected by the web terminal device indicating that a user of the web terminal device has selected to make a telephone call to the external telephone device via a clicking operation on the web terminal device, and the call control server device includes:

an internal information storage module that stores an identifier for uniquely identifying the web terminal device, the identifier being associated with internal connection destination information that indicates information for connecting to the internal telephone device;

an internal information identifying module that, when notified of the external connection destination information from the service providing server device via the web terminal device, identifies the internal connection destination information in the internal information storage module, based on the identifier of the web terminal device added by the web terminal device at the time of the notification of the external connection destination information;

a first transmitting module that makes a call to the internal telephone device, using the internal connection destination information identified by the internal information identifying module;

a second transmitting module that makes a call to the external telephone device, using the external connection destination information transmitted from the service providing server device, upon receipt of a response from the internal telephone device called by the first transmitting module; and a connection establishing module that establishes a connection between the internal telephone device called by the first transmitting module and the external telephone device called by the second transmitting module, upon receipt of a response from the external telephone device called by the second transmitting module.

7. The communication control system according to claim 6, wherein the external information transmitting module of the service providing server device adds a verifiable form to the external connection destination information, when notifying the call control server device of the acquired external connection destination information, and under the condition that the transmitted external connection destination information is verified as valid information based on the verifiable form transmitted from the service providing server device via the web terminal device, the internal information identifying module of the call control server device identifies the internal connection destination information in the internal information storage module from the identifier added by the web terminal device at the time of the notification of the external connection destination information.

8. The communication control system according to claim 6, wherein the service providing server device further includes a counting module that counts the number of times the content has been transmitted from the access responding module of the Web server device to the service providing server device.

9. The communication control system according to claim 8, wherein, when the device ID provided by the content is selected by the web terminal device, the counting module counts the number of times the device ID has been selected.

10. The communication control system according to claim 6, wherein the call control server device further includes a call counting module that counts the number of times a call has been made to the internal telephone device by the first transmitting module, using the internal connection destination information identified by the internal information identifying module.

11. The communication control system according to claim 6, wherein the call control server device further includes a connection counting module that, upon receipt of a response from the external telephone device called by the second transmitting module, counts the number of times a connection between the internal telephone device called by the first transmitting module and the external telephone device called by the second transmitting module has been established by the connection establishing module.

12. A communication control method to be applied to communication control system that connects an internal telephone device in an internal network and an external telephone device provided outside the internal network, the internal network being formed with the internal telephone device and a web terminal device that is separate from the internal telephone device and that performs various communications, the communication control method comprising:

transmitting a device ID stored in an external information storage module to the web terminal device upon receipt of an access request from the web terminal device, the external information storage module storing the device ID for uniquely identifying the external telephone device, the device ID being associated with external connection destination information that indicates information for connecting to the external telephone device;

acquiring the external connection destination information corresponding to the transmitted device ID from the external information storage module, upon receipt of a notification that the transmitted device ID is selected by a clicking operation on the web terminal device;

identifying internal connection destination information stored in an internal information storage module upon receipt of a notification that the transmitted device ID is selected by the web terminal device indicating that a user of the web terminal device has selected to make a telephone call to the external telephone device, the internal connection destination information being associated with an identifier of the web terminal device selecting the device ID;

making a call to the internal telephone device, using the identified internal connection destination information;

making a call to the external telephone device, using the acquired external connection destination information, upon receipt of a response from the called internal telephone device; and establishing a connection between the called internal telephone device and the called external telephone device, upon receipt of a response from the called external telephone device.

13. A call control server device in a communication control system that includes an internal network formed with an internal telephone device and a web terminal device that performs various communications, a service providing server device that provides various services to the web terminal device, an external telephone device that is provided outside the internal network, and the call control server device that connects the internal telephone device and the external telephone device, the call control server device comprising:

an internal information storage module that stores an identifier for uniquely identifying the web terminal device, the identifier being associated with internal connection destination information that indicates information for connecting to the internal telephone device;

an internal information identifying module that, when notified of external connection destination information from the service providing server device via the web terminal device indicating that a user of the web terminal device has selected to make a telephone call to the external telephone device via a clicking operation on the web terminal device, identifies the internal connection destination information in the internal information storage module, based on the identifier of the web terminal device added by the web terminal device at the time of the notification of the external connection destination information;

a first transmitting module that makes a call to the internal telephone device, using the internal connection destination information identified by the internal information identifying module;

a second transmitting module that makes a call to the external telephone device, using the external connection destination information acquired by the service providing server device, upon receipt of a response from the internal telephone device called by the first transmitting module; and a connection establishing module that establishes a connection between the internal telephone device called by the first transmitting module and the external telephone device called by the second transmitting module, upon receipt of a response from the external telephone device called by the second transmitting module.

14. A call control server device in a communication control system that includes an internal network formed with an internal telephone device and a web terminal device that is separate from the internal telephone device and that performs various communications, a Web server device that provides content to the web terminal device, a service providing server device that provides the internal device with content information for attracting customers to the content, an external telephone device that puts up the content information on the content provided by the Web server device, and the call control server device that connects the internal telephone device and the external telephone device, the call control server device comprising:

an internal information storage module that stores an identifier for uniquely identifying the web terminal device, the identifier being associated with internal connection destination information that indicates information for connecting to the internal telephone device;

an internal information identifying module that, when notified of external connection destination information from the service providing server device via the web terminal device indicating that a user of the web terminal device has selected to make a telephone call to the external telephone device via a clicking operation on the web terminal device, identifies the internal connection destination information in the internal information storage module, based on the identifier of the web terminal device added by the web terminal device at the time of the notification of the external connection destination information;

a first transmitting module that makes a call to the internal telephone device, using the internal connection destination information identified by the internal information identifying module;

a second transmitting module that makes a call to the external telephone device, using the external connection destination information transmitted from the service providing server device, upon receipt of a response from the internal telephone device called by the first transmitting module; and a connection establishing module that establishes a connection between the internal telephone device called by the first transmitting module and the external telephone device called by the second transmitting module, upon receipt of a response from the external telephone device called by the second transmitting module.

15. A non-transitory computer readable storage medium having stored therein a call control program executed by a computer serving as a call control server device in a communication control system that includes an internal network formed with an internal telephone device and a web terminal device that performs various communications, a service providing server device that provides various services to the web terminal device, an external telephone device that is provided outside the internal network, and the call control server device that connects the internal telephone device and the external telephone device, the call control program causing the computer to perform:

identifying, when external connection destination information is transmitted from the service providing server device via the web terminal device indicating that a user of the web terminal device has selected to make a telephone call to the external telephone device via a clicking operation on the web terminal device, an internal connection destination information in an internal information storage module, based on an identifier of the web terminal device added by the web terminal device at the time of notification of the external connection destination information, the internal information storage module storing the identifier for uniquely identifying the web terminal device, the identifier being associated with the internal connection destination information that indicates information for connecting to the internal telephone device;

making a call to the internal telephone device, using the identified internal connection destination information;

making a call to the external telephone device, using the acquired external connection destination information, upon receipt of a response from the called internal telephone device; and establishing a connection between the called internal telephone device and the called external telephone device, upon receipt of a response from the called external telephone device.

16. A non-transitory computer readable storage medium having stored therein a call control program to be executed by a computer serving as a call control server device in a communication control system that includes an internal network formed with an internal telephone device and a web terminal device that that is separate from the internal telephone device and performs various communications, a Web server device that provides content to the web terminal device, a service providing server device that provides the web terminal device with content information for attracting customers to the content, an external telephone device that puts up the content information on the content provided by the Web server device, and the call control server device that connects the internal telephone device and the external telephone device, the call control program causing the computer to perform:

identifying, when external connection destination information is transmitted from the service providing server device via the web terminal device indicating that a user of the web terminal device has selected to make a telephone call to the external telephone device via a clicking operation on the web terminal device, an internal connection destination information in an internal information storage module, based on an identifier of the web terminal device added by the web terminal device at the time of notification of the external connection destination information, the internal information storage module storing the identifier for uniquely identifying the web terminal device, the identifier being associated with the internal connection destination information that indicates information for connecting to the internal telephone device;

making a call to the internal telephone device, using the identified internal connection destination information;

making a call to the external telephone device, using the external connection destination information transmitted from the service providing server device, upon receipt of a response from the called internal telephone device; and establishing a connection between the called internal telephone device and the called external telephone device, upon receipt of a response from the called external telephone device.

* * * * *